United States Patent
Fukuzawa et al.

(10) Patent No.: US 6,678,522 B2
(45) Date of Patent: Jan. 13, 2004

(54) SYSTEM FOR MANAGEMENT OF LOCATION INFORMATION FOR MOBILE TERMINAL IN MOBILE SWITCHING NETWORK

(75) Inventors: Yohji Fukuzawa, Fukuoka (JP); Osamu Mitarai, Dazaifu (JP); Hiroshi Ooiwane, Fukuoka (JP)

(73) Assignee: Fujitsu Limited, Kawasaki (JP)

(*) Notice: Subject to any disclaimer, the term of this patent is extended or adjusted under 35 U.S.C. 154(b) by 379 days.

(21) Appl. No.: 09/902,414

(22) Filed: Jul. 10, 2001

(65) Prior Publication Data

US 2001/0051522 A1 Dec. 13, 2001

Related U.S. Application Data

(63) Continuation of application No. PCT/JP99/00196, filed on Jan. 20, 1999.

(51) Int. Cl.⁷ .............................. H04Q 7/20; H04B 1/38
(52) U.S. Cl. .................... 455/435.1; 455/433; 455/560; 455/414.1
(58) Field of Search .......................... 455/435.1, 435.2, 455/432.1, 433, 414.1, 414.3, 514, 517, 560, 426.2, 404.2, 456.1, 461, 458

(56) References Cited

U.S. PATENT DOCUMENTS 5,946,620 A * 8/1999 Schultz et al. ............. 455/435
6,185,421 B1 * 2/2001 Alperovich et al. ........ 455/433
6,549,775 B2 * 4/2003 Ushiki et al. ............... 455/432

FOREIGN PATENT DOCUMENTS

| JP | 63160434 A | 7/1988 |
| JP | 07327259 A | 12/1995 |
| JP | 08033018 A | 2/1996 |
| JP | 08317460 A | 11/1996 |
| JP | 09130855 A | 5/1997 |

* cited by examiner

Primary Examiner—Duc M. Nguyen
(74) Attorney, Agent, or Firm—Katten Muchin Zavis Rosenman

(57) ABSTRACT

A method of management of location information for a mobile terminal in a mobile switching network (10) having a subscriber accommodating center (12) for accommodating a mobile terminal (15) through a base station (13) and a service control point (11) located at a level higher than the subscriber accommodating center and managing the current position of all mobile terminals. Here, the location information for a mobile terminal in the service control point is fixed in accordance with a request from a subscriber of the mobile terminal, and a subscriber accommodating center having the mobile terminal under it stops the registration of the location information of the mobile terminal for the service control point.

20 Claims, 25 Drawing Sheets

(SUBSCRIBER ACCOMODATING CENTER 12)

(SUBSCRIBER ACCOMODATING CENTER 12)

SYSTEM FOR MANAGEMENT OF LOCATION INFORMATION FOR MOBILE TERMINAL IN MOBILE SWITCHING NETWORK

CROSS-REFERENCE TO RELATED APPLICATIONS

This application is a continuation of PCT/JP99/00196.

TECHNICAL FIELD

The present invention relates to a location information management system for a mobile station (hereinafter "mobile terminal") in a mobile switching network.

BACKGROUND ART

In general, a mobile switching network is comprised of a plurality of base stations each communicating wirelessly directly with mobile stations (hereinafter "mobile terminals") in its service area, a plurality of subscriber accommodating centers each accommodating a preassigned group of base stations and functioning as an exchange, and a service control point at a level higher than these subscriber accommodating centers and managing the location information of all of the mobile terminals present in the mobile switching network.

Assume that a connection request is generated from one mobile terminal X to another mobile terminal Y. This being so, the subscriber accommodating center A inquires at the service control point about the current position of the destination mobile terminal Y through the base station accommodating the mobile terminal X in its service area. The subscriber accommodating center A obtaining the location information corresponding to the inquiry (Y being assumed to be under the subscriber accommodating center B) performs circuit switching to the subscriber accommodating center B shown by the location information. Here, the mobile terminal X is connected to the mobile terminal Y and a communication path is set between the two terminals.

As explained above, by providing a service control point for continually managing the current location information for all mobile terminals at a level higher than all of the subscriber accommodating centers, the subscriber accommodating centers can switch and connect mobile terminals extremely quickly. Note that there are various occasions on which individual mobile terminals register their locations at a service control point, but as an example sometimes a mobile terminal moves from a service area of one base station to a service area of another base station.

In this way, in a mobile switching network, there are both the inherent communication traffic for connecting mobile terminals and communicating between the two and control traffic for managing the location information between the service control point and the subscriber accommodating centers (registering locations and inquiring about location information).

When the number of subscribers of mobile terminals in a mobile switching network is small, the control traffic is small compared with the communication traffic and does not pose that much of a problem. In recent years, however, the number of subscribers of mobile terminals has sharply increased and a large amount of control traffic has been generated. The reason is that a subscriber accommodating center registers a location at the service control point unconditionally and immediately at every opportunity for registration of location regardless of the intent of the user of the mobile terminal.

Therefore, unnecessary control traffic having no relation with the inherent communication traffic has sharply risen in the mobile switching network and the load on the mobile switching network as a whole has increased. This has created a problem.

DISCLOSURE OF THE INVENTION

The present invention was made in consideration of the above problem and has as its object the realization of a location information management system able to reduce the control traffic particularly generated for location registration and as a result reduce the load of the mobile switching network as a whole.

The present invention proposes the following techniques to achieve this object:

First, the method upon which the present invention is predicated is a method of management of location information for a mobile terminal in a mobile switching network having a subscriber accommodating center accommodating a mobile terminal through a base station and a service control point at a level higher than the subscriber accommodating center and managing the current location of all mobile terminals. Here, the present invention is characterized by fixing the location information for a mobile terminal at the service control point in accordance with a request from the subscriber of the mobile terminal and having the subscriber accommodating center having the mobile terminal under it stop location registration for the mobile terminal to the subscriber accommodating center.

Further, the invention is characterized by having a subscriber accommodating center receiving a request for fixing the location information from the subscriber of the mobile terminal manage the location information of the mobile terminal on its own.

In this way, the management of the location information of a mobile terminal issuing a request for fixing its location information is left to the designated subscriber accommodating center related to the request and part of the management of the location information originally performed by the service control point is shared with the subscriber accommodating center side. As a result, the load on the mobile switching network as a whole is lightened and effective use can be made of limited resources.

BRIEF DESCRIPTION OF THE DRAWINGS

The present invention will be described below with reference to the attached drawings, wherein.

BEST MODE FOR WORKING THE INVENTION

To clarify the effects brought about by the present invention, an explanation will first be given of the configuration of a general mobile switching network to which the present invention is not applied.

Figure 1:
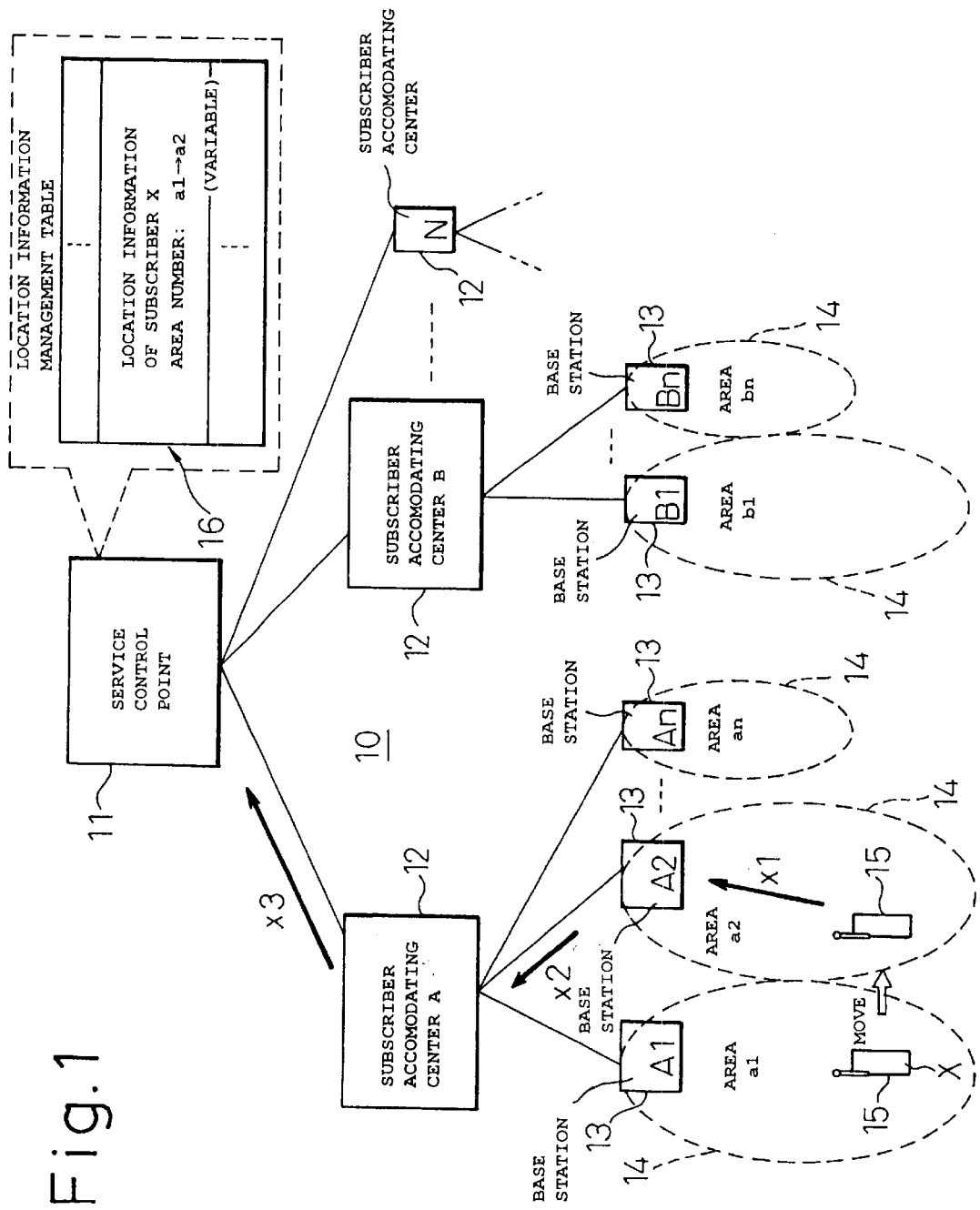
FIG. 1 is a view of a first aspect of location registration in a general mobile switching network.

FIG. 1 is a view of a first aspect of location registration in a general mobile switching network. In the first aspect, the case is shown where one mobile terminal moves from a service area of one base station (area where wireless conversation or communication is possible) to the service area of another base station belonging to the same subscriber accommodating center.

In FIG. 1, the service control point (SCP) 11 in the mobile switching network 10 is located at a level higher than the plurality of subscriber accommodating centers 12A, 12B ... 12N and centrally manages the current locations of all of the mobile terminals 15 present in the mobile switching network 10 as location information.

The subscriber accommodating centers 12A, 12B ... 12N positioned at a level below the service control point 11 mainly perform circuit switching among the mobile terminals 15 located in the service areas 14$a$1, 14$a$2, 14$an$ ... 14$b$1, 14$bn$ etc.

When there is a connection request from one mobile terminal 15 to another mobile terminal 15, the subscriber accommodating center 12 having the former mobile terminal 15 under it inquires at the service control point 11 about the current location information of the latter mobile terminal 15. The subscriber accommodating center 12 connects to the corresponding subscriber accommodating center 12 based on the location information notified from the SCP 11 in response to the inquiry. Note that the base stations 13A1, 13A2, 13An, 13B1 ... manage the statuses of all of the mobile terminals 15 present in the service areas 14$a$1, 14$a$2, 14$an$, 14$b$1 ...

In the above mobile switching network 10, each mobile terminal 15 performs so-called location registration so that each subscriber accommodating center 12 can specify the location it is present in. Here, "location registration" means processing for registering location information enabling identification of the service area (14) in which each mobile terminal 15 is present in a certain database 16 in the subscriber accommodating center 11. Therefore, this database 16 functions as a location information management table of the mobile terminals.

In the first aspect shown in this figure, the example is shown of the case where the mobile terminal 15(X) leaves the service area 14$a$1 and moves to the adjoining service area 14$a$ of the base station 13A2. Due to the change in status of the mobile terminal 15(X) at this time, the base station 13A2 requests the above location registration for the mobile terminal 15(X) from the corresponding subscriber accommodating center 12A. The request for location registration up to there is executed in the order of the arrow x→arrow x2 shown in the figure.

The subscriber accommodating center 12A receiving the request for location registration sends the request to the higher service control point 11 by the route shown by the arrow x3 in the figure and completes the location registration (a1→a2) in the above location registration management table (database 16).

The location registration here is performed due to a change in the status of the mobile terminal 15. That is, the location registration is performed at the time of a change in status of each mobile terminal. There are the following three typical types of changes of status:

(i) When a mobile terminal 15 moves from one service area 14 to another service area 14 (case of FIG. 1).

(ii) When the power source of a mobile terminal 15 switches from off to on.

(iii) When a radio wave from a mobile terminal 15 located in a service area 14 switches from a state which the corresponding base station 13 cannot receive it to a state which it can receive.

That is, when shifting to a state where communication between the base station and the mobile terminal is possible, location registration is performed at all times at the service control point 11 through a corresponding subscriber accommodating center 12.

Figure 2:
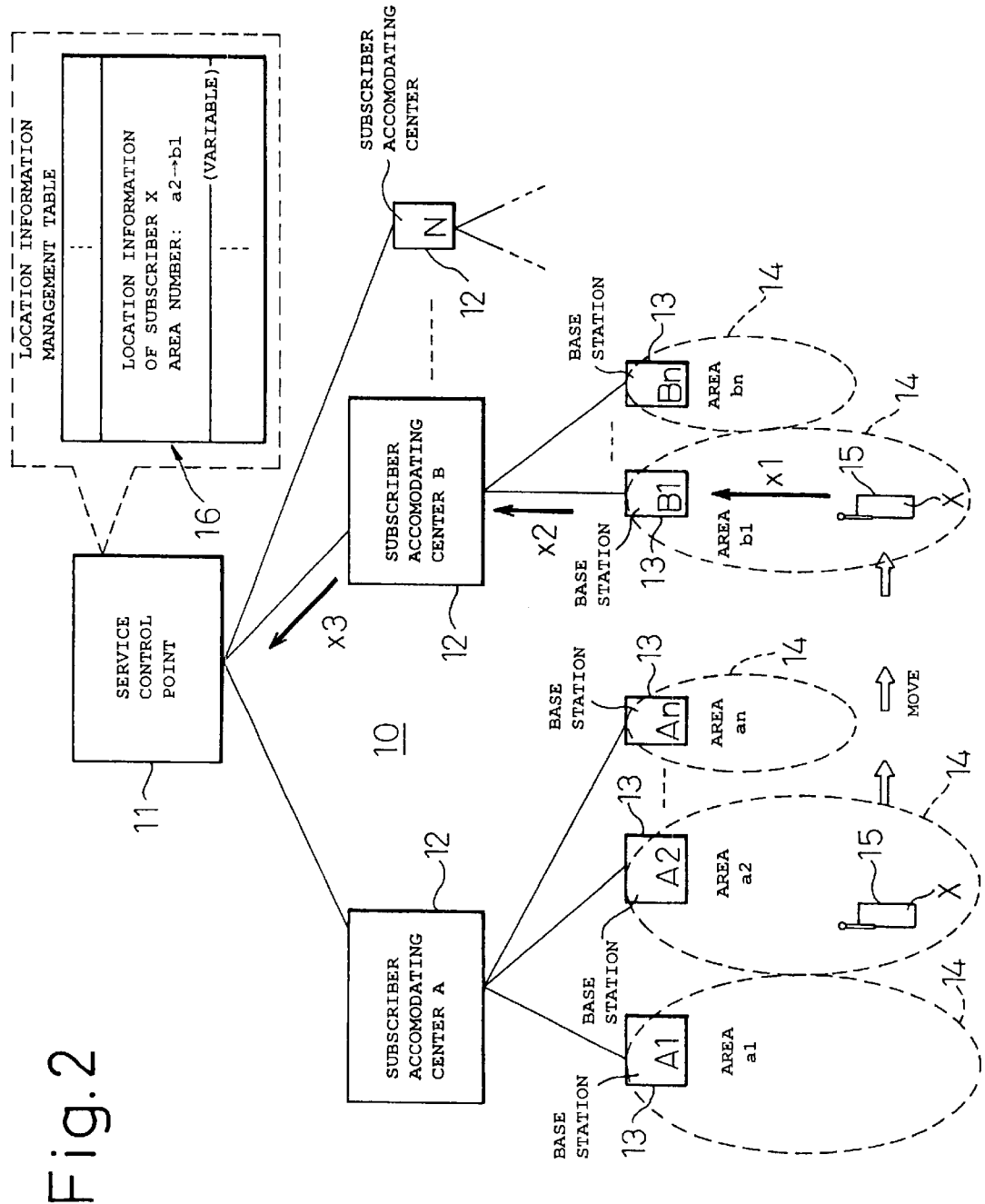
FIG. 2 is a view of a second aspect of location registration in a general mobile switching network.

FIG. 2 is a view of a second aspect of location registration in a general mobile switching network. Note that throughout the drawings, similar constituent elements are shown by the same reference numerals or symbols.

In the second aspect, the mobile terminal 15(X) leaves the service area 14a1 belonging to the subscriber accommodating center 12A and moves to the service area 14b1 belonging to another subscriber accommodating center 12B. Due to this, a request for location registration is made through the corresponding base station 13B1 to the subscriber accommodating center 12B in the order of the arrow x1→arrow x2 illustrated in the figure.

The subscriber accommodating center 12B receiving the request for location registration sends the request to the higher service control point 11 by the route shown by the arrow x3 in the figure and completes the desired location registration (a2→b1) at the location registration management table (database 16).

Figure 3:
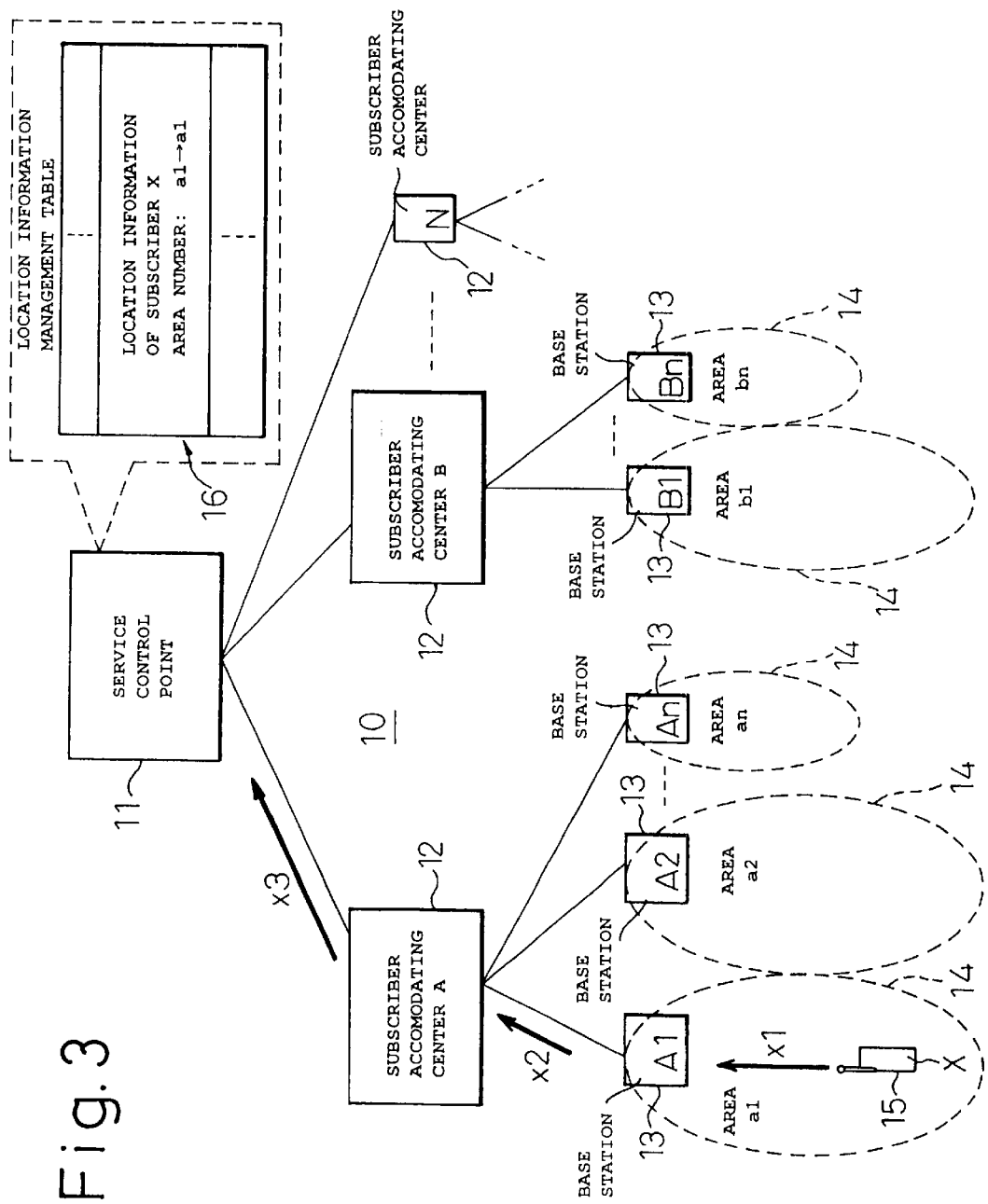
FIG. 3 is a view of a third aspect of location registration in a general mobile switching network.

FIG. 3 is a view of a third aspect of location registration in a general mobile switching network.

The third aspect corresponds to the case of (ii) or (iii) of the representative examples of the change of status of the mobile terminal explained above.

When switching the power source from off to on in the service area 14a1 in which the mobile terminal 15(X) is present, a request for location registration is sent to the subscriber accommodating center 12A through the corresponding base station 13A1 in the order of the arrow x1→x2 illustrated in the figure.

The subscriber accommodating center 12A receiving the request for location registration sends the request to the higher service control point 11 through the route shown by the arrow x3 in the figure and completes the desired position registration (a1→a1) in the above location registration management table (database 16).

Location registration completely the same as this location registration is performed not only in the above case of turning on the power, but also the case of the representative example (iii) of the change of status. That is, this is the case where a mobile terminal 15(X) which had been outside the range of the service area 14a1 shown in FIG. 3 again enters the service area a1. In this case as well, the request for location registration is sent to the service control point 11 in the order of the arrow x1→arrow x2→arrow x3.

The location registration under the above first to third aspects is performed for each of the extremely large number of mobile terminals 15, so the load of the mobile switching network 10 as a whole is increased. In particular, the location registration under the third aspect (a1→a1) is an overwrite of the same location information. This is extremely wasteful processing for the network as a whole.

One proposal to solve this problem has already been made in Japanese Unexamined Patent Publication (Kokai) No. 8-275226. The mobile terminal disclosed in this publication is a mobile terminal having a location registration prohibit function and has at least a keypad unit, storage unit, control unit, and display unit. The keypad unit is operated by the user of the mobile terminal and requests the prohibition of location registration. The storage unit stores the request for prohibition of the location registration, while the display unit displays that. The control unit keeps a request for location registration from being made to the base station even when the user of a mobile terminal moves between location registration areas when a request for prohibition of location registration is stored in the storage unit.

There are disadvantages to the above proposal, however. First, the above problem can only be solved for a mobile terminal provided in advance with the above special function. The problem cannot be solved for the large number of existing mobile terminals. A second disadvantage is that special control becomes required for the interface between the base station and the mobile terminal, so modifications have to be made in the large number of existing interfaces.

If the technique of the present invention explained in detail below is applied, the above first and second disadvantages in the above proposal (Japanese Unexamined Patent Publication (Kokai) No. 8-275226) do not occur. According to this technique of the present invention, the location information of the mobile terminal 15 is managed by the corresponding subscriber accommodating center 12 or by the service control point 11 as usual depending on whether the location information of the service control point 11 is fixed or not fixed. Therefore, in particular, when fixing the location information, the location registration to the service control point 11 which had been performed each time the mobile terminal changed in status becomes unnecessary and the control traffic is greatly reduced when viewing the system 10 as a whole.

Here, a detailed explanation will be made of the "fixing of location information". In general, looking at the aspects by which a subscriber (user) of a mobile terminal uses his or her mobile terminal, the first aspect is where the user uses the mobile terminal while moving from one to another of a plurality of service areas 14 shown in FIG. 1. On the other hand, the second aspect is where the user uses the mobile terminal just in for example the service area 14a1 shown in FIG. 1 or just in any plurality of service areas of the service areas 14a1 to 14an belonging to the subscriber accommodating center 12A.

The present invention takes note of the second aspect of use among the two aspects of use. If assuming that the range of daily activity of a subscriber (user) (range from which calls are made or received) is the home, the office, stores, or an office building fixed to a single location or a plurality of locations, the aspect of use of the subscriber falls under the above second aspect of use. In this aspect of use, the ID of the subscriber accommodating center (12A according to the above example) registered in the management area corresponding to the subscriber in the location information management table (database 16) in the service control point 11 shown in FIG. 1 does not change much at all. The fact that despite this, the same ID is overwritten in the management area each time a change of status of the mobile terminal occurs as it does frequently only wastefully increases the traffic inside the system, in particular between the subscriber accommodating center and the service control point.

Therefore, for a subscriber believed to fall under the second aspect of use, the location registration is changed (rewritten) only at the subscriber accommodating center accommodating the subscriber. No request for change of the location registration to the service control point usually performed is made. Due to this, the traffic accompanying a request for change is eliminated. The location information is fixed in the corresponding management area in the location information management table in the service control point.

The entity determining if such a service should be received is the subscriber (user) for which the aspect of use is known and is not the carrier providing the service. This being the case, the subscriber applying for the service must operate predetermined keys by the mobile terminal (or apply to the service control point side) at the initial time of the start of use of the mobile terminal to send a message for application of the service to the corresponding subscriber accommodating center. Despite forcing the subscriber to operate the keys in this way, however, the service directly benefits the carrier which can avoid wasteful traffic. Therefore, in actual operation, it has been considered to give some sort of incentive to the subscriber applying for the service such as a reduction of the basic rates.

When applying the above service, even if the service control point fixes the location information, due to actual reasons, the subscriber sometimes has to move from the fixed service area to another service area. It is possible that a call from another subscriber to that subscriber then cannot be completed or will be hindered. Measures against this point will be explained later.

Figure 4:
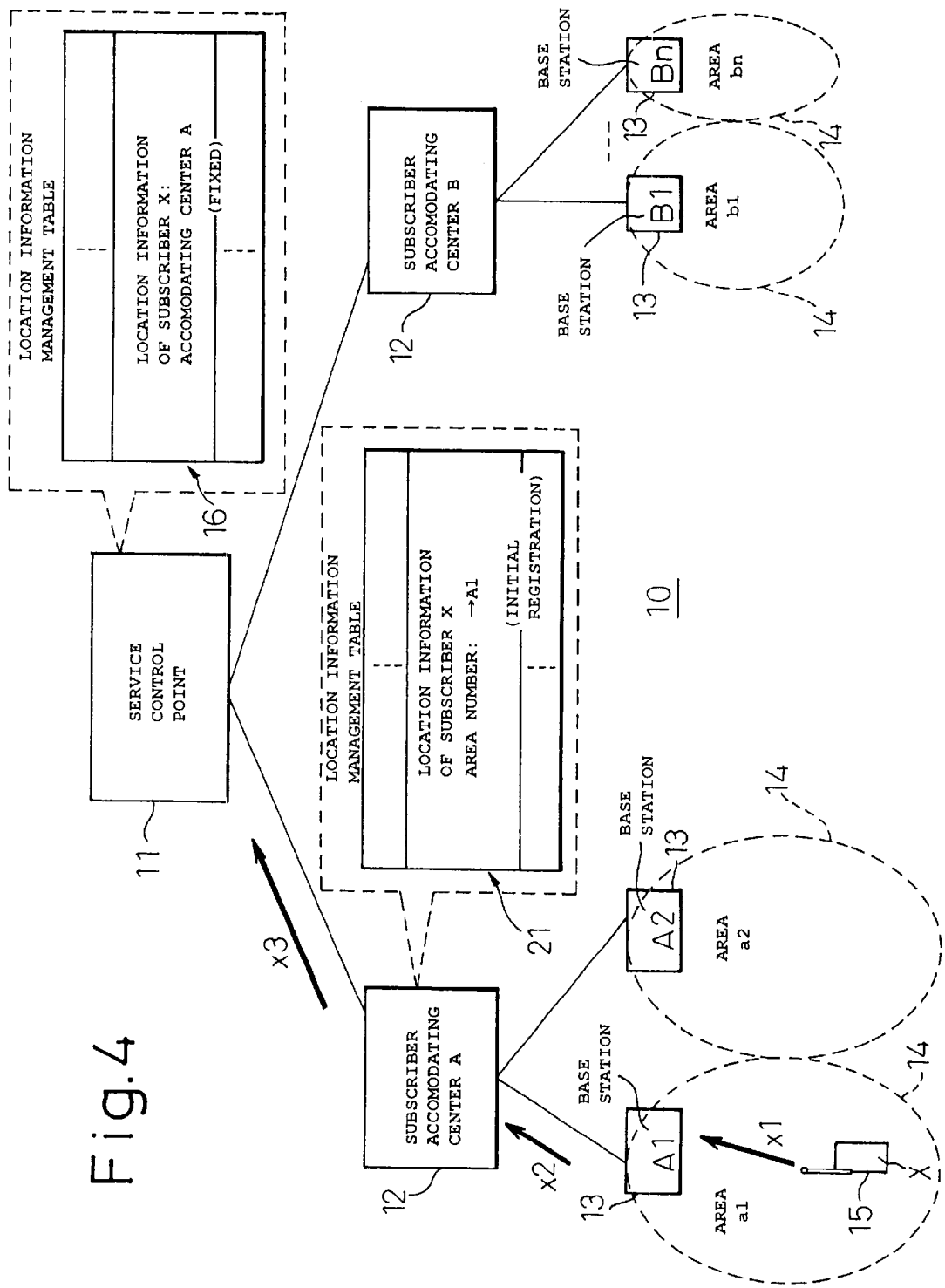
FIG. 4 is a view of "fixing of location information" according to the present invention (at time of initial registration)

FIG. 4 is a view of "fixing of location information" according to the present invention (at time of initial registration). Note that this figure should be viewed in substantially the same way as the above FIGS. 1 to 3.

The parts to be noted in this figure are the database 21 (location information management table) newly provided in the subscriber accommodating center 12 and the data showing the "fixing of the location information" (fixed) written in the database 16 (location information management table) in the service control point 11. Note that the database 21 is shown only for the subscriber accommodating center 12A, but it is similarly provided for the other subscriber accommodating center 12B etc.

From this figure, it is understood that a request for fixing of location information from the subscriber is sent from the mobile terminal 15(X) of the subscriber and that the subscriber accommodating center 12A receiving the request notifies the request to the service control point 11.

The mobile terminal 15(X) sends a request for "fixing of the location information" in the service area 14a1 (arrow x1 in the figure). The base station 13A receiving this request transfers this request to the corresponding subscriber accommodating center 12A (arrow x2). The SAC 12A notifies this request to the service control point 11 (arrow x3). The SCP 11 establishes settings to fix the location registration at the region of the subscriber in the location information management table in it (fix to subscriber accommodating center 12A). Here, the initial registration of the "fixing of location information" is completed. After this, so long as there is no request for release, the location information is held as it is. If there is a request for release, it is changed from fixed to nonfixed (as usual).

Figure 5:
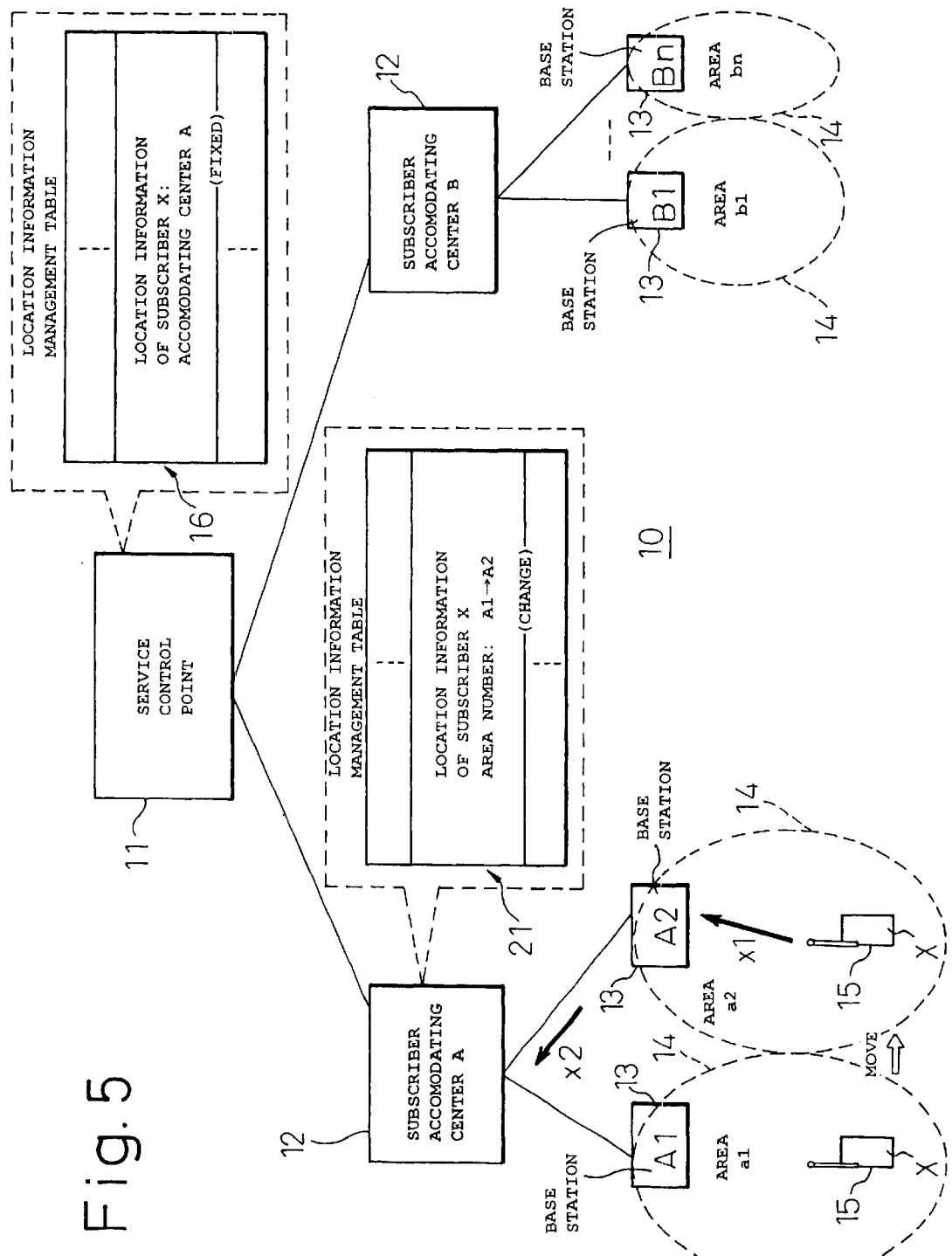
FIG. 5 is a general view of generation of a request for fixing of location information in the present invention.

FIG. 5 is a view of generation of a request for fixing of location information in the present invention.

Assume that after the initial registration ends, a change in status occurs in the mobile terminal 15(X). In the example of this figure, the case is shown where the terminal 15(X) leaves the service area 14a1 and moves to the adjoining service area 14a2.

The request for location registration arising due to a change in status is transmitted to the base station 13A2 (arrow x1 in the figure). The station 13A2 notifies the request to the subscriber accommodating center 12A (arrow x2).

The subscriber accommodating center 12A searches through the location information management table in the database 21 and changes the location registration (A1 A2) at the management area if the ID of the mobile terminal of the subscriber is found there. With this, the new location registration ends. No request is made for location registration to the service control point 11 as in the past.

Note that the initial registration shown in FIG. 4 is an example of execution from the mobile terminal side, but it is also possible to execute it from a maintenance terminal (see 49 of FIG. 24) attached to the service control point 11. That is, it is also possible to have the service control point 11 receive the request for fixing the location information from the subscriber and have the service control point 11 notify this request to that subscriber accommodating center 12. The subscriber accommodating center 12 receiving this notification registers the "fixing of location information" in the location information management table in the database 21 of that subscriber accommodating center.

Next, an explanation will be made of specific steps for executing the method of management of location information in a mobile switching network based on the present invention, but before that an explanation will be given of the above location information management tables required for this method (databases 16 and 21).

Figure 6:
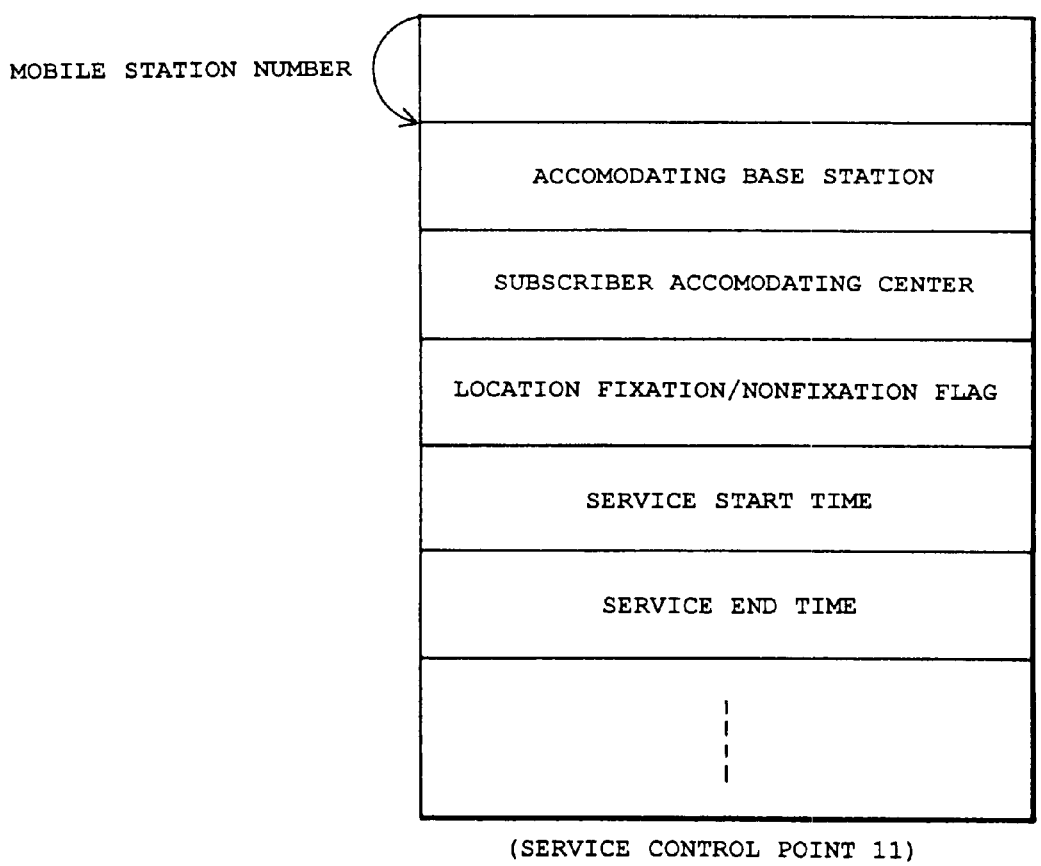
FIG. 6 is a general view of a specific example of a location information management table in the database 16.

FIG. 6 is a view of a specific example of a location information management table in the database 16.

The data of the table (16) in the service control point 11 is data to manage the location information of all of the mobile terminals 15 in the mobile switching network 10.

The "accommodating base station" stores the number (ID) of the base station 13 managing the service area 14 where the mobile terminal 15 is currently located.

The "subscriber accommodating center" area stores the number (ID) of the subscriber accommodating center 12 managing the above base station 13.

The "location fixing/nonfixing flag" area stores the setting conditions of the location information of the mobile terminal 15:

Ex.) 0: location not fixed
    1: location fixed

The "service start time" area stores the time of start of operation of the location information fixing service.

The "service end time" area stores the time of the end of operation of the location information fixing service.

Figure 7:
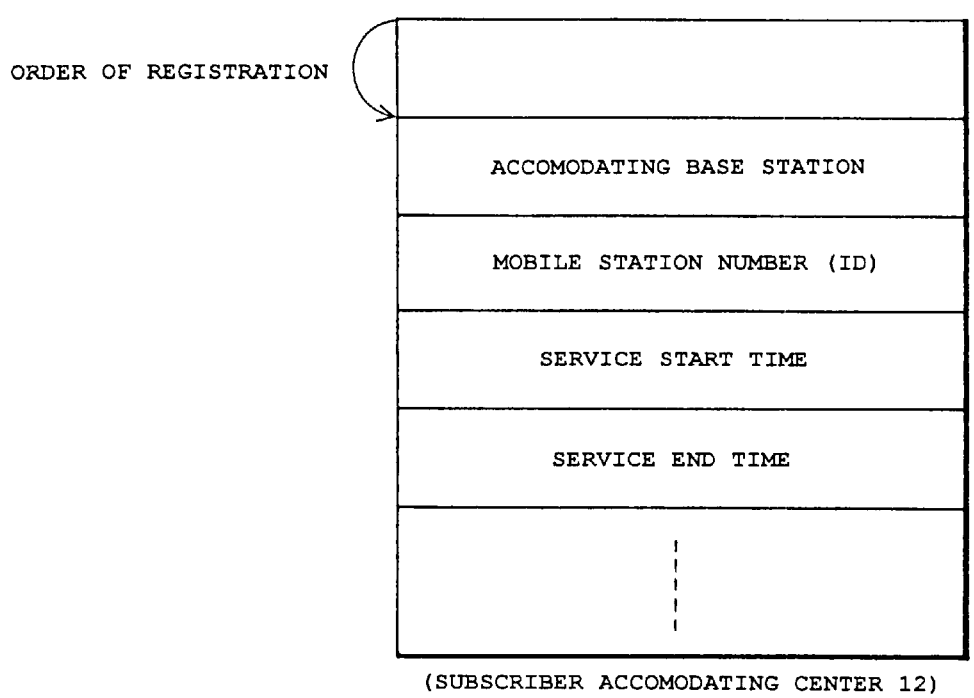
FIG. 7 is a view of a specific example of a first location information management table in the database 21.

FIG. 7 is a view of a specific example of a first location information management table in the database 21. The data of the first table is used for managing inside the subscriber accommodating center 12 the location information of a mobile terminal 15 managed in the base station 13 inside the subscriber accommodating center 12 when receiving a request for "fixing of location information" from the terminal 15.

The "accommodating base station" area stores the number (ID) of the base station 13 managing the service area 14 where the mobile terminal 15 is currently located.

The "mobile terminal number" area stores the number (ID) of the mobile terminal 15 registered as currently fixed in location information.

The "service start time" area stores the time of start of operation of the location information fixing service.

The "service end time" area stores the time of the end of operation of the location information fixing service.

Figure 8:
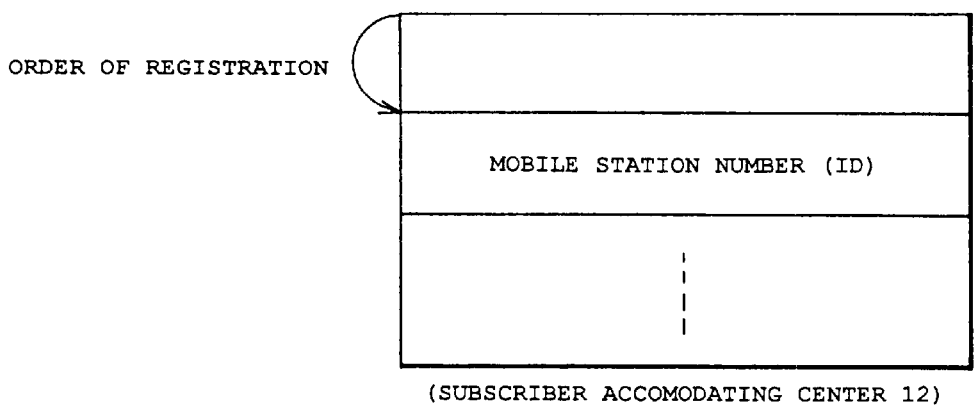
FIG. 8 is a view of a specific example of a second location information management table in the database 21.

FIG. 8 is a view of a specific example of a second location information management table in the database 21.

The data in the second table is used for restricting the location registration for a mobile terminal 15 registered for "fixing of location information" in another subscriber accommodating center 12 when the mobile terminal 15 moves into the service area 14 of the base station 13 accommodated in the subscriber accommodating center 12.

The "mobile terminal number (ID)" area stores the number (ID) of the mobile terminal 15 registered as currently fixed in location information at another center.

When such a mobile terminal 15 moves into its own management area 14 and location registration is requested to the service control point 11 as usual, the other subscriber accommodating center 12 is notified that the mobile terminal has been registered as fixed in location information by the service control point 11. Due to this notification, the ID is recorded in the table of FIG. 8.

Figure 9:
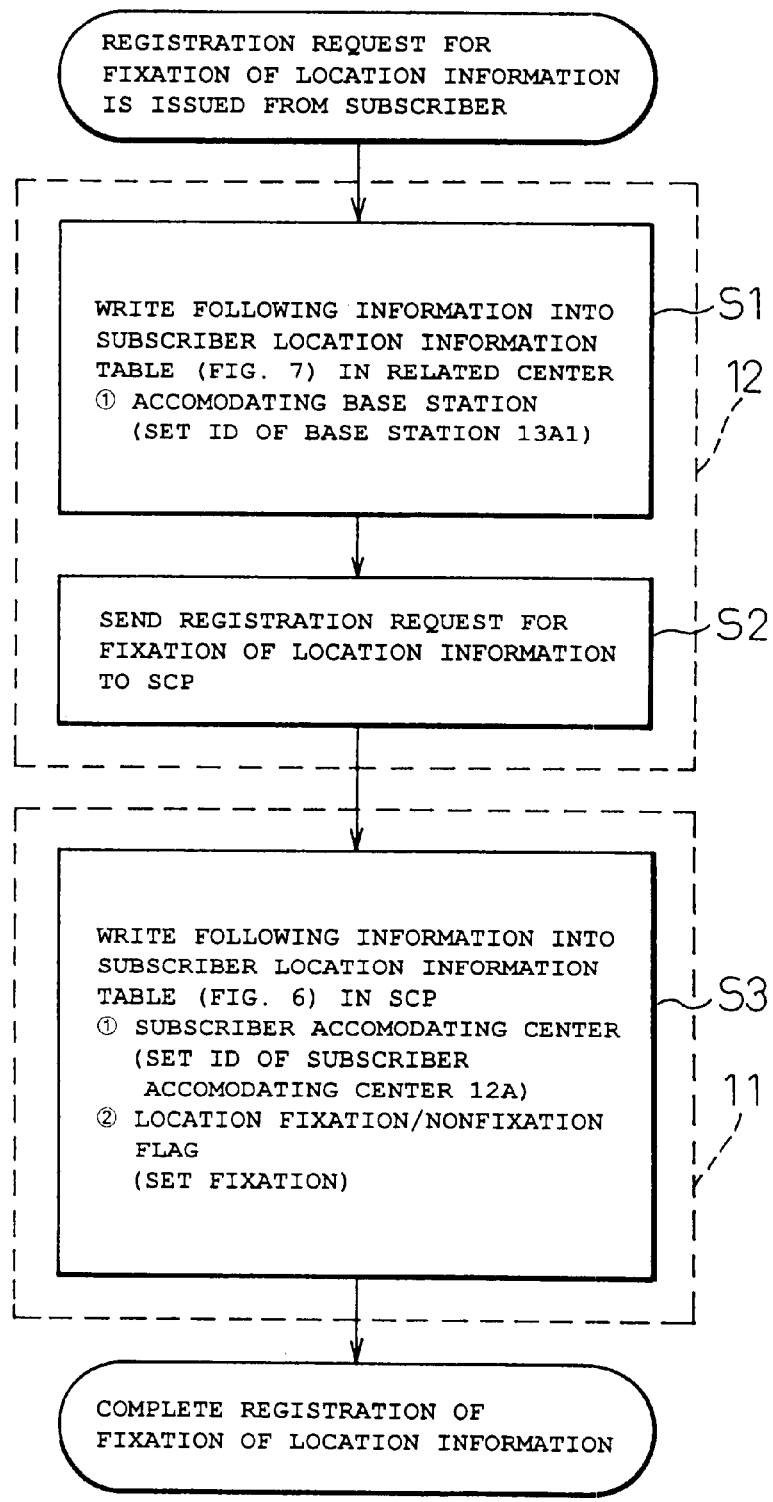
FIG. 9 is a flow chart of processing when registering fixing of location information from the mobile terminal side.

FIG. 9 is a flow chart of processing when registering fixing of location information from the mobile terminal side.

In the figure, steps S1 and S2 are parts of processing performed by the subscriber accommodating center 12, while step S3 is a part of processing performed by the service control point 11. Note that hereinafter the service control point 11 will sometimes be referred to as an SCP for convenience.

Figure 10:
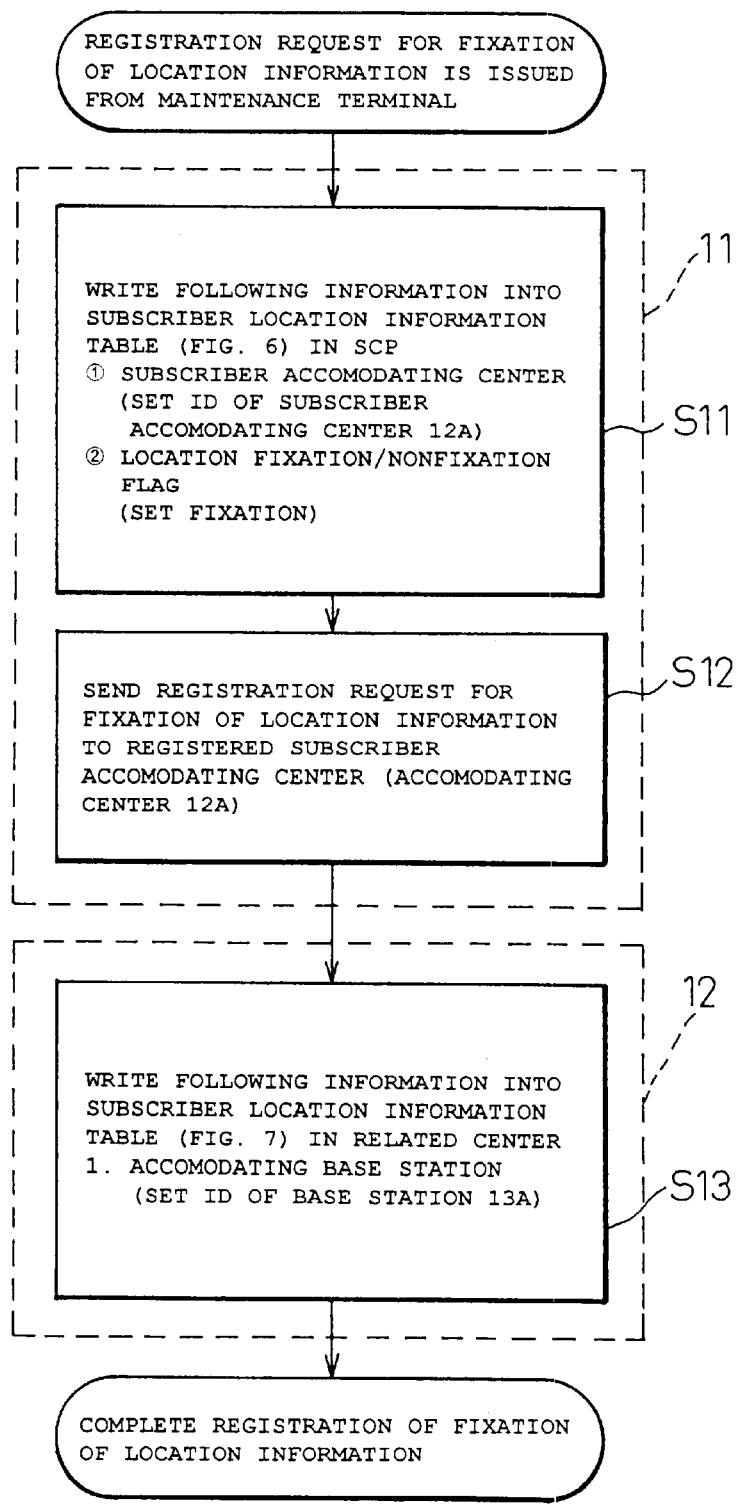
FIG. 10 is a flow chart of processing when registering fixing of location information from the service control point side.

FIG. 10 is a flow chart of processing when registering fixing of location information from the service control point side.

In the figure, steps S11 and S12 are parts of processing performed by the service control point 11, while step S13 is a part of processing performed by the subscriber accommodating center 12.

Figure 11:
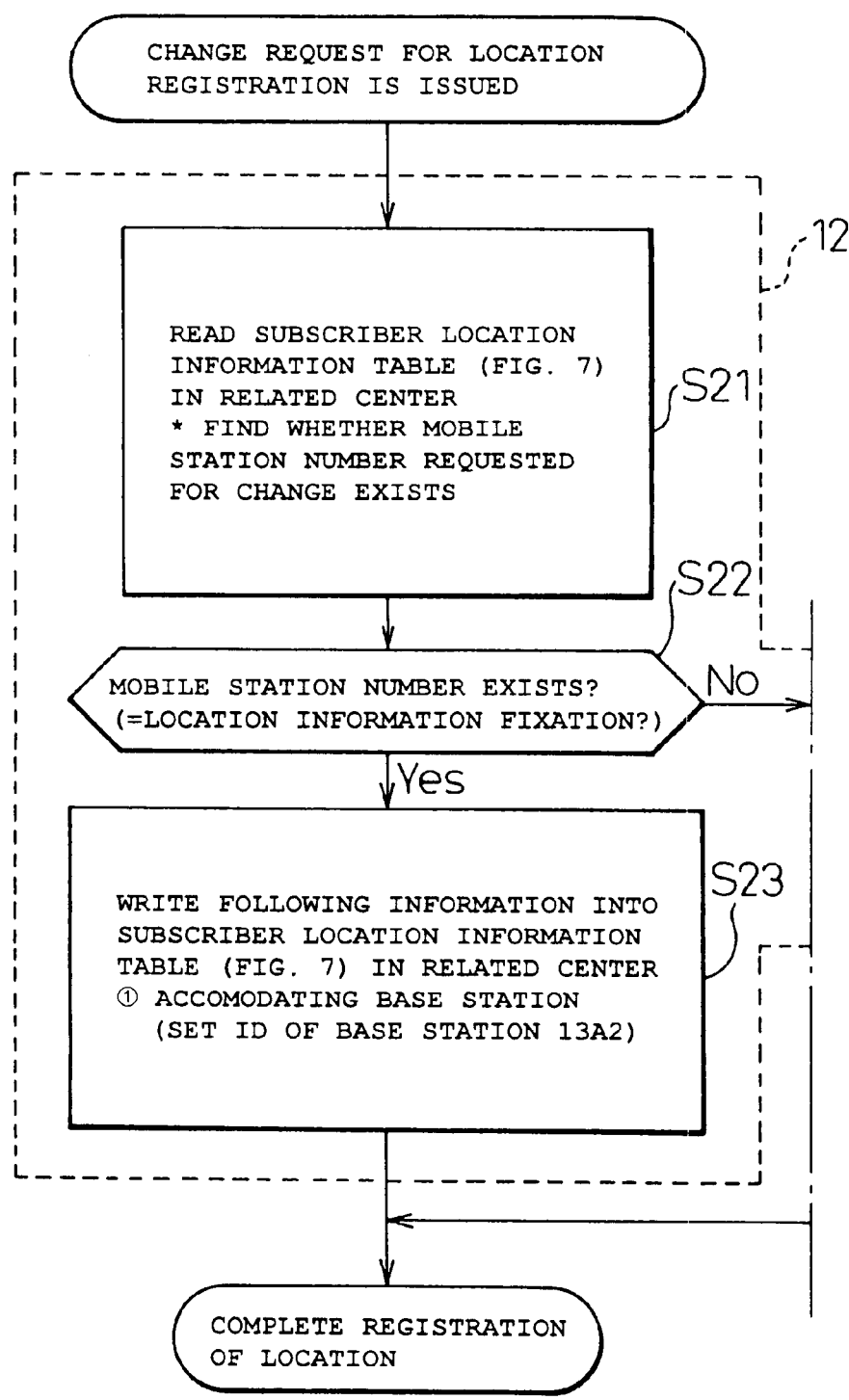
FIG. 11 is a flow chart of processing when a request for change of location information is generated (part 1)
Figure 12:
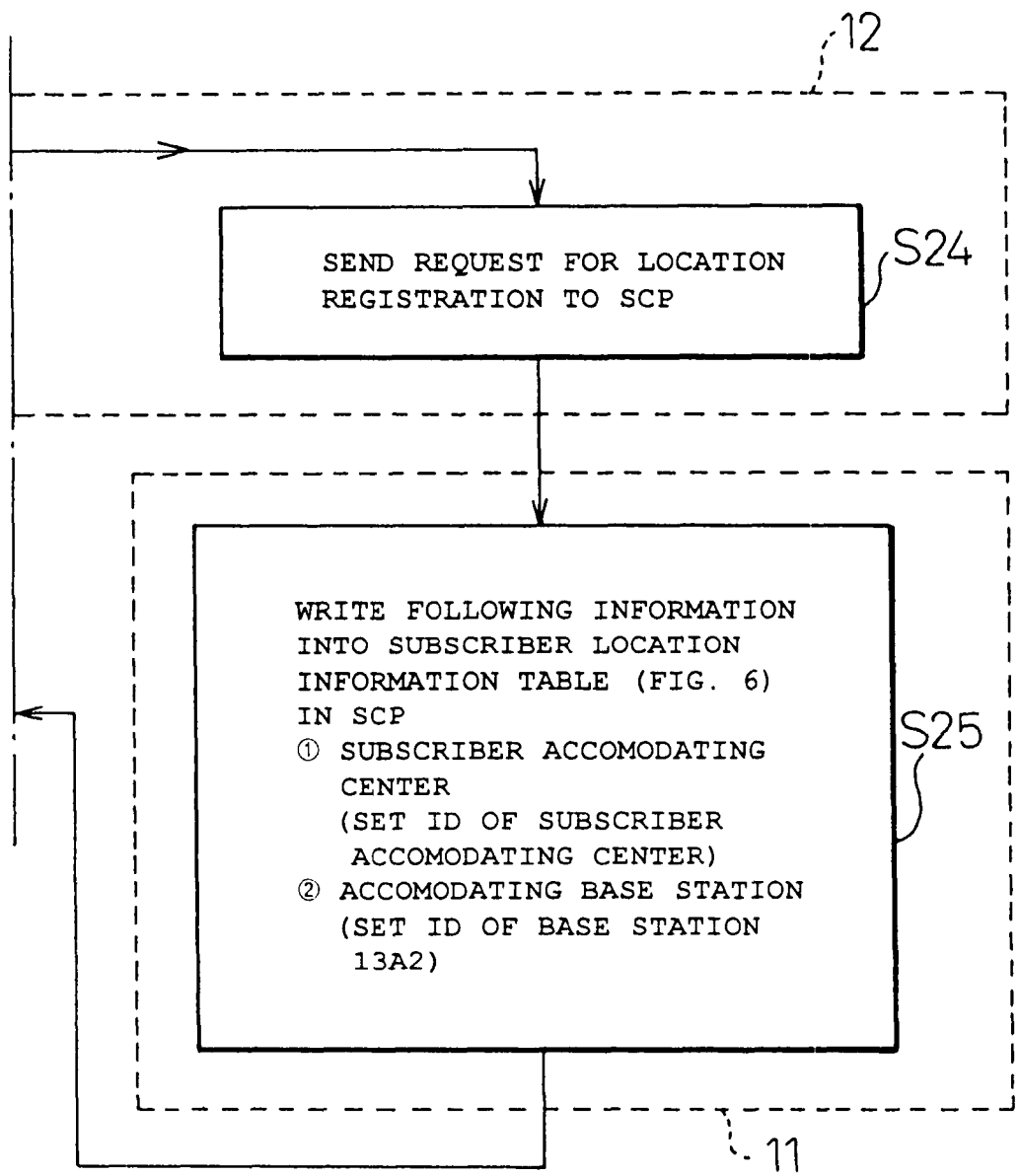
FIG. 12 is a flow chart of processing when a request for change of location information is generated (part 2)

FIG. 11 is a flow chart of processing when a request for change of location information is generated (part 1); and FIG. 12 is the same flow chart (part 2).

In these figures, steps S21, S22, S23, and S24 are parts of processing performed by the subscriber accommodating center 12, while step S25 is a part of processing performed by the service control point 11.

According to the processing of the flow chart shown in FIG. 11 and FIG. 12, the subscriber accommodating center (for example 12A) determines if location information regarding the mobile terminal 15 is fixed or not fixed when a request for re-registration of the location information is generated due to a change in status of the mobile terminal 15 (S22), re-registers the location information inside it when it is fixed (S23), and requests re-registration of the location information to the service control point 11 when it is not fixed (S24). Therefore, steps S24 and S25 shown in FIG. 12 are parts of the usual (conventional) processing.

Figure 13:
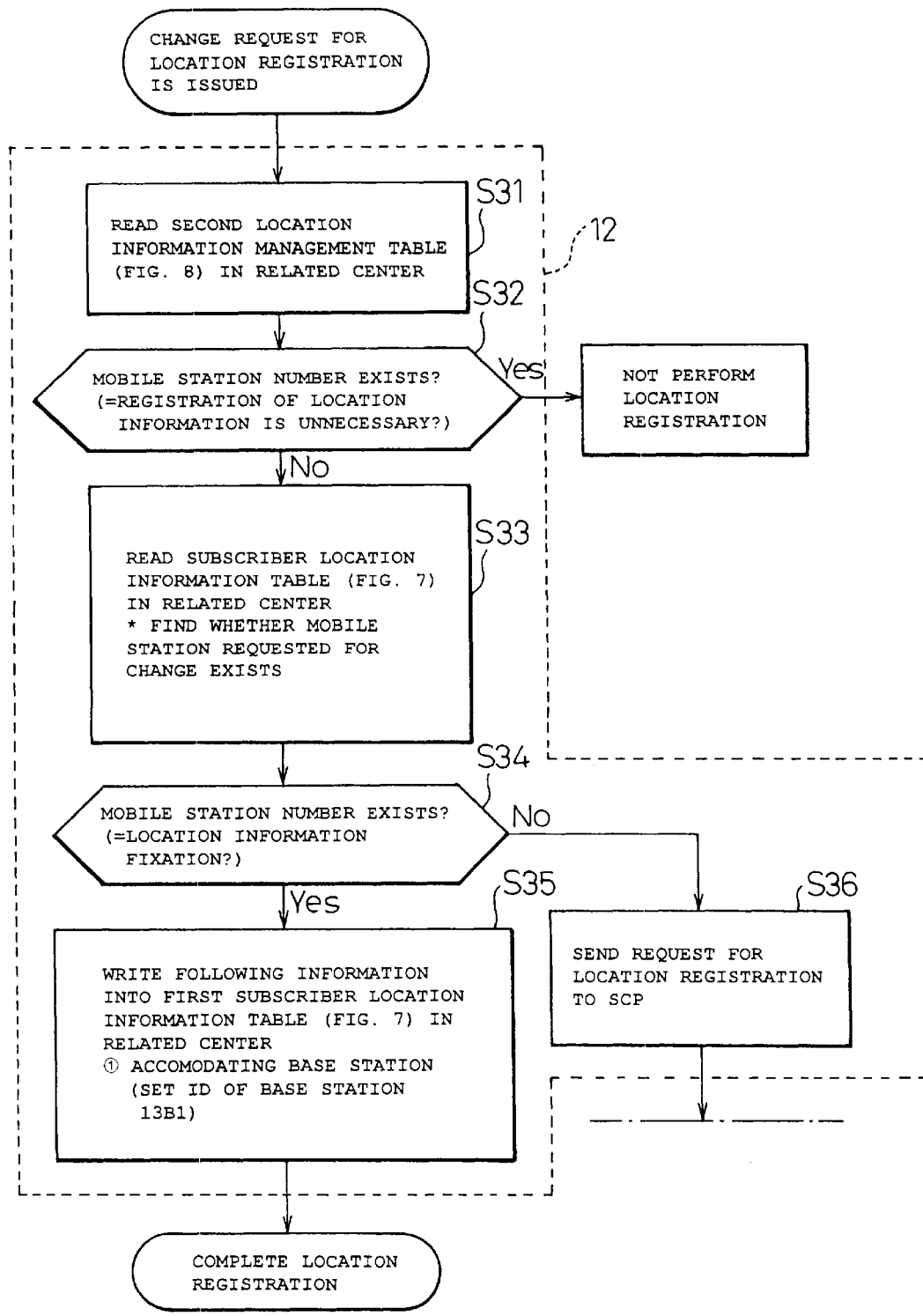
FIG. 13 is a flow chart of processing when a mobile terminal first enters a service area other than a service area registered for fixing of location information (part 1)
Figure 14:
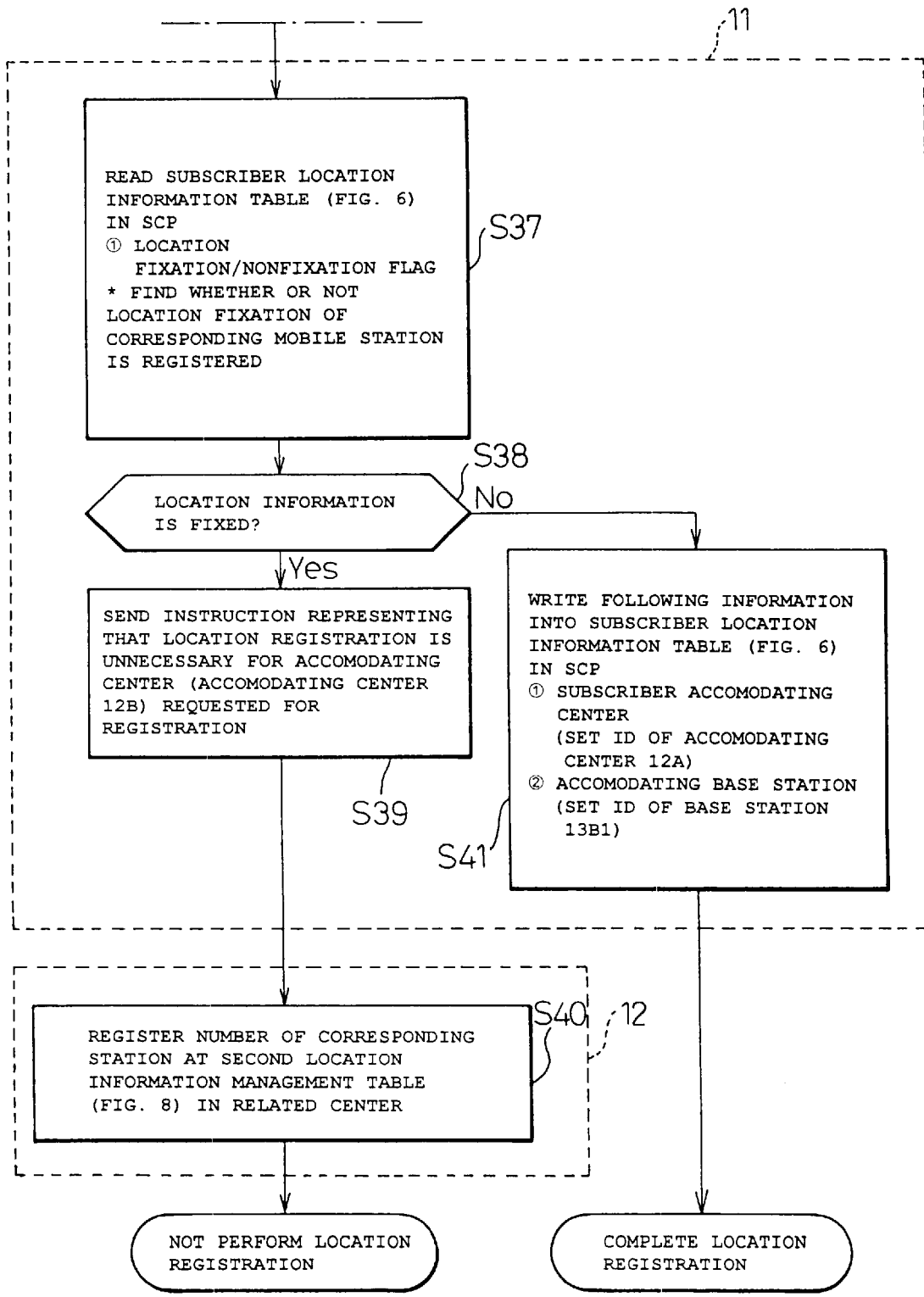
FIG. 14 is a flow chart of processing when a mobile terminal first enters a service area other than a service area registered for fixing of location information (part 2)

FIG. 13 is a flow chart of processing when a mobile terminal first enters a service area other than a service area registered for fixing of location information (part 1); and FIG. 14 is the same flow chart (part 2).

In these figures, steps S31 to S36 and S40 are parts of processing performed by the subscriber accommodating center 12, while steps S37 to S39 and S41 are parts of the processing performed by the service control point 11.

The parts of the processing shown in these figures are related to the second location information management table in the subscriber accommodating center 12 explained in FIG. 8. For example, referring to FIG. 2, the processing at the subscriber accommodating center 12B when the mobile terminal 15(x), having the location information registered as the subscriber accommodating center 12A, is away from its accommodating area, for example, is in the service area 14b1, is shown in FIG. 13 and FIG. 14.

In this case, when the mobile terminal 15(X) first enters the area 14b1 of the subscriber accommodating center 12B, since the number of the mobile terminal is not yet registered in the second location information management table (FIG. 8) in the subscriber accommodating center 12B, the subscriber accommodating center 12A requests location registration of the mobile terminal to the service control point 11 as usual. In this case, however, since the fact that the mobile terminal is registered for fixing of location information at the subscriber accommodating center 12A is notified from the service control point 11 to the subscriber accommodating center 12B, the number (ID) of the mobile terminal is registered for the first time in the second location information management table (FIG. 8) in the subscriber accommodating center 12B.

Figure 15:
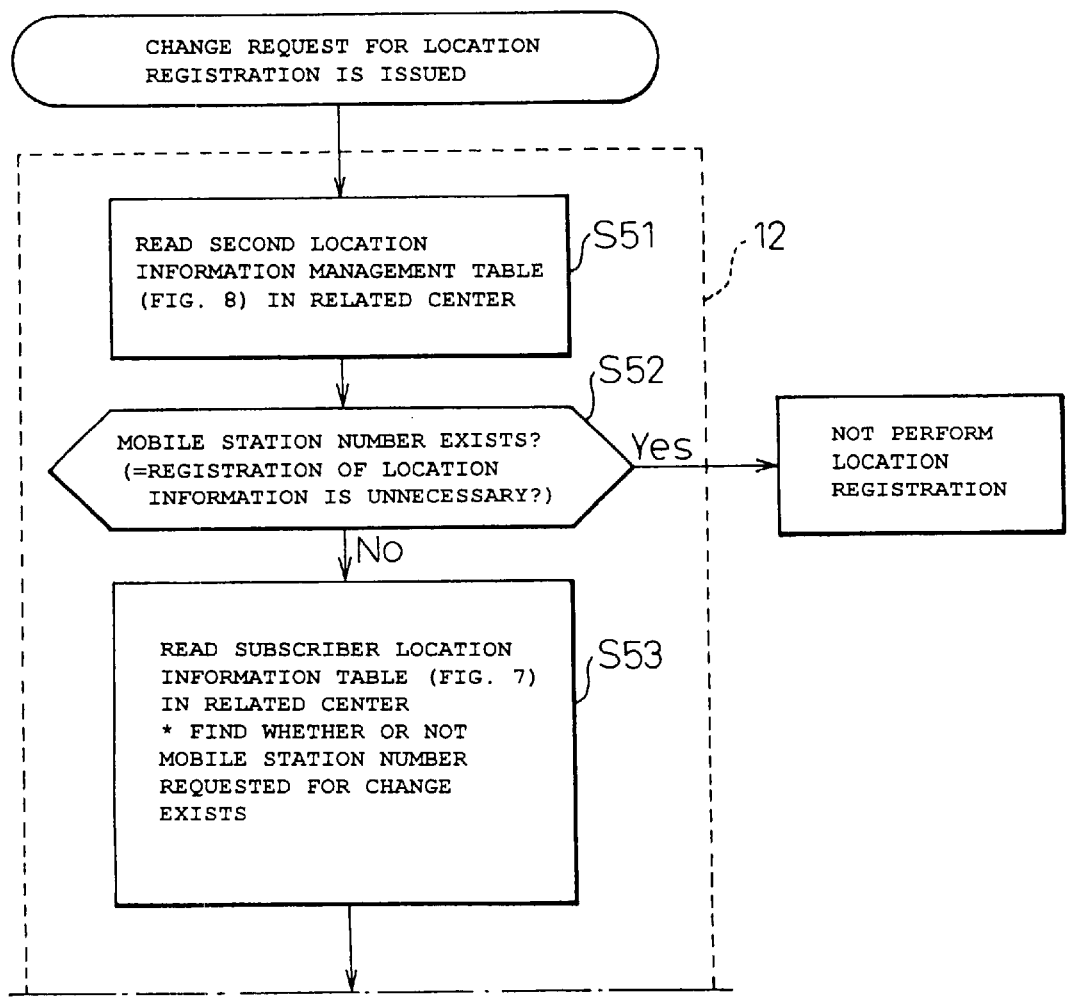
FIG. 15 is a flow chart of processing after once a mobile terminal enters a service area other than a service area registered for fixing of location information (part 1)
Figure 16:
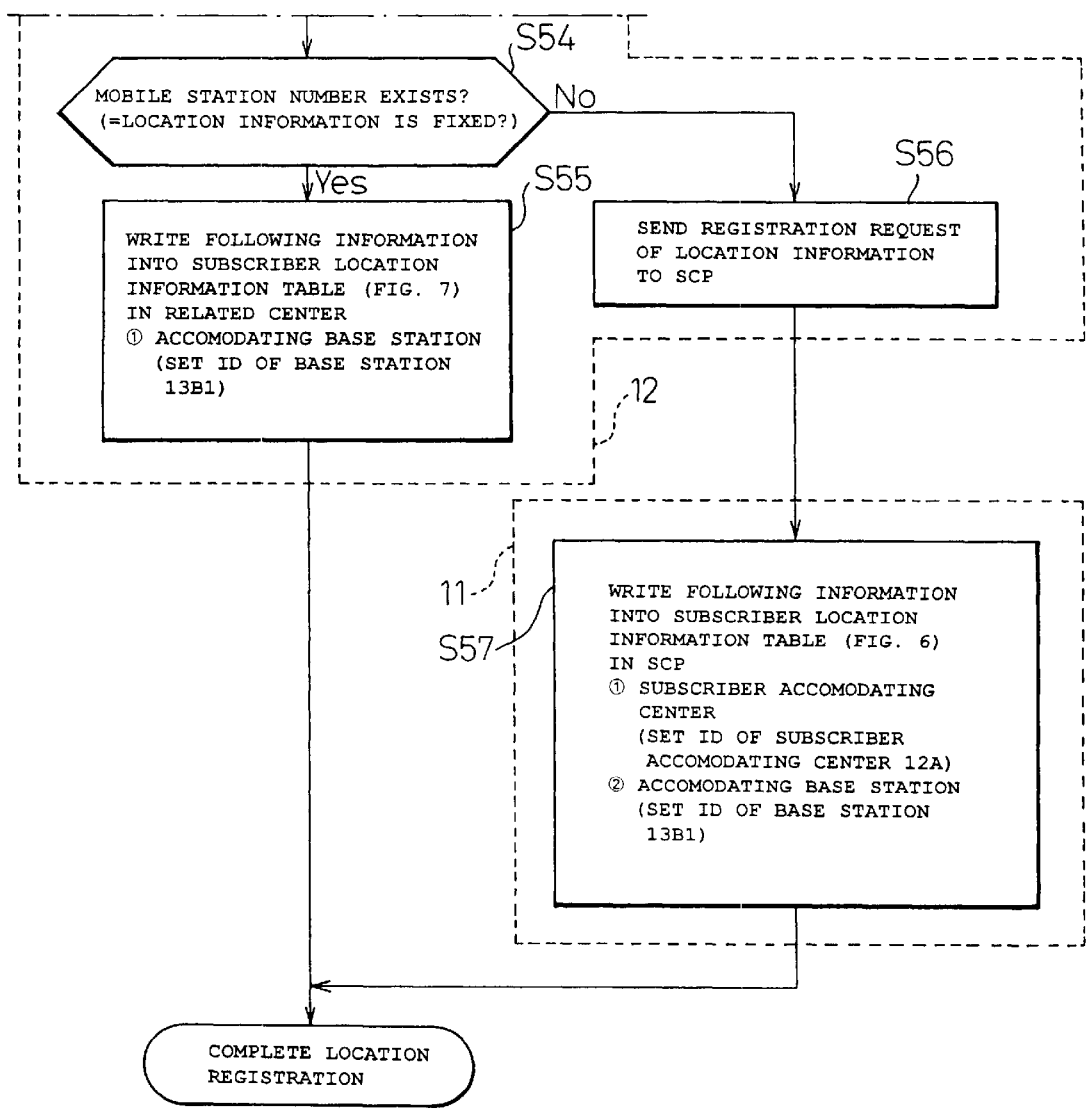
FIG. 16 is a flow chart of processing after a mobile terminal enters a service area other than a service area registered for fixing of location information (part 2)

The processing when a change in status occurs in the mobile terminal 15(X) again in the area 14b1 after the ID of the mobile terminal 15(X) is registered once in the second location information management table in the subscriber accommodating center 12B is shown in FIG. 15 and FIG. 16.

In short, the processing of FIG. 13 and FIG. 14 comprises having a subscriber accommodating center (for example 12B) other than the subscriber accommodating center (for example 12A) receiving the request for fixing the location information determine if the location information of the mobile terminal has been registered as fixed at the service control point 11 when a change in status of the mobile terminal 15 occurs in an area (14b1) of the other subscriber accommodating center 12B and register the ID of the mobile terminal 15 as an ID not requiring location registration in the service control point 11 inside it when it is registered as fixed (S40).

FIG. 15 is a flow chart of processing after a mobile terminal enters a service area other than a service area registered for fixing of location information (part 1); and FIG. 16 is the same flow chart (part 2).

In these figures, steps S51 to S56 are parts of processing performed at the subscriber accommodating center 12, while step S57 is a part of the processing performed at the service control point 11.

In this case, the mobile terminal 15(X) fixing the location information at the subscriber accommodating center 12A has finished registering the information in the second location information management table (FIG. 8) of the subscriber accommodating center 12B, so the processing ends at step S52 of FIG. 15 and the location registration at the service control point 11 is stopped.

Note that the processing when the mobile terminal 15(X) does not receive the service for fixing the location information follows after step S53.

In short, the processing of FIG. 15 comprises having a subscriber accommodating center (for example 12B) other than the subscriber accommodating center (for example, 12A) receiving the request for fixing the location information determine if the ID is registered inside it when a change in status of the mobile terminal 15 occurs in an area (14b1) of the subscriber accommodating center 12B (S52) and not perform location registration at the service control point 11 when it is registered.

Figure 17:
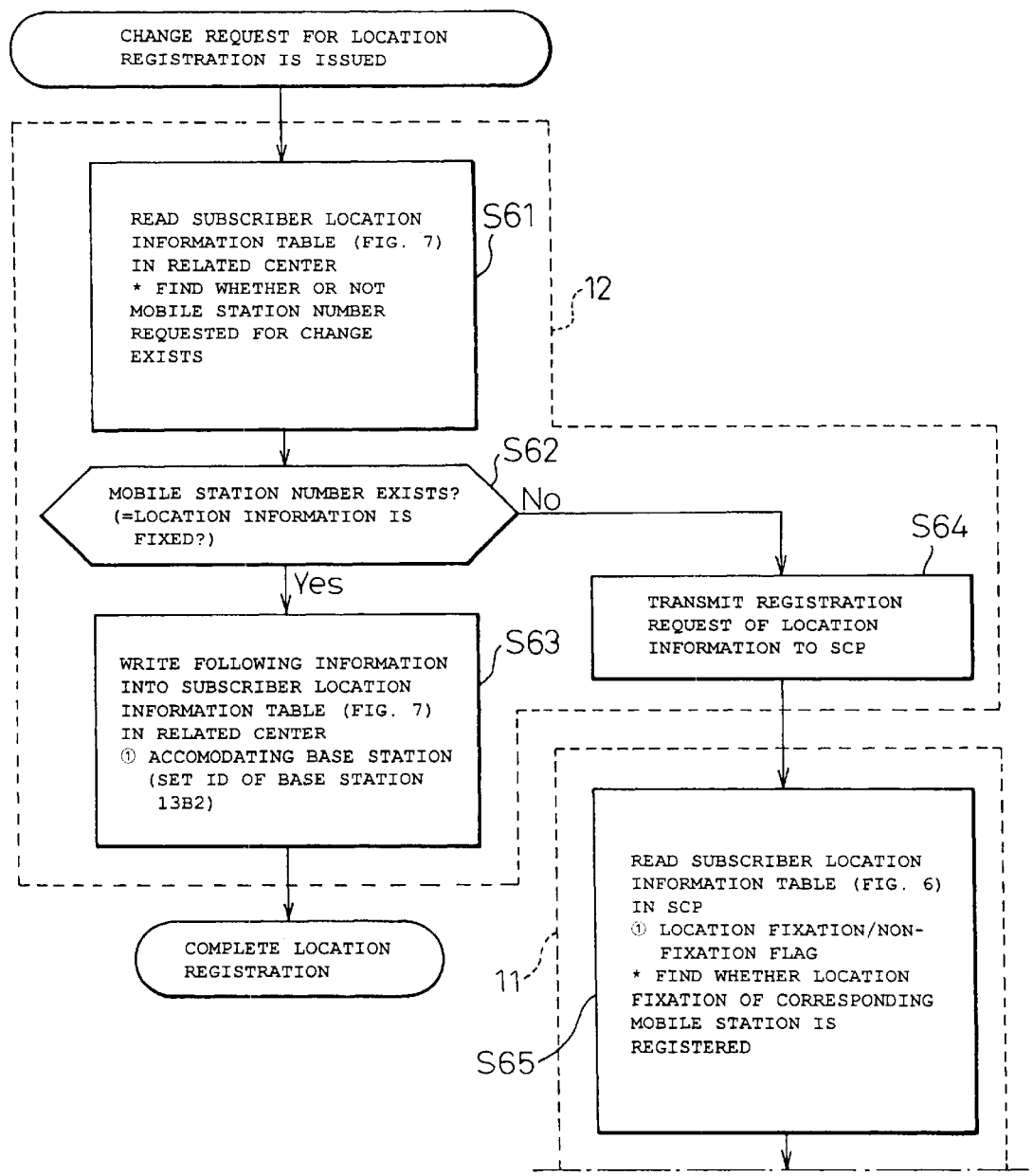
FIG. 17 is a flow chart of a service added to the processing of FIG. 15 and FIG. 16 (part 1)
Figure 18:
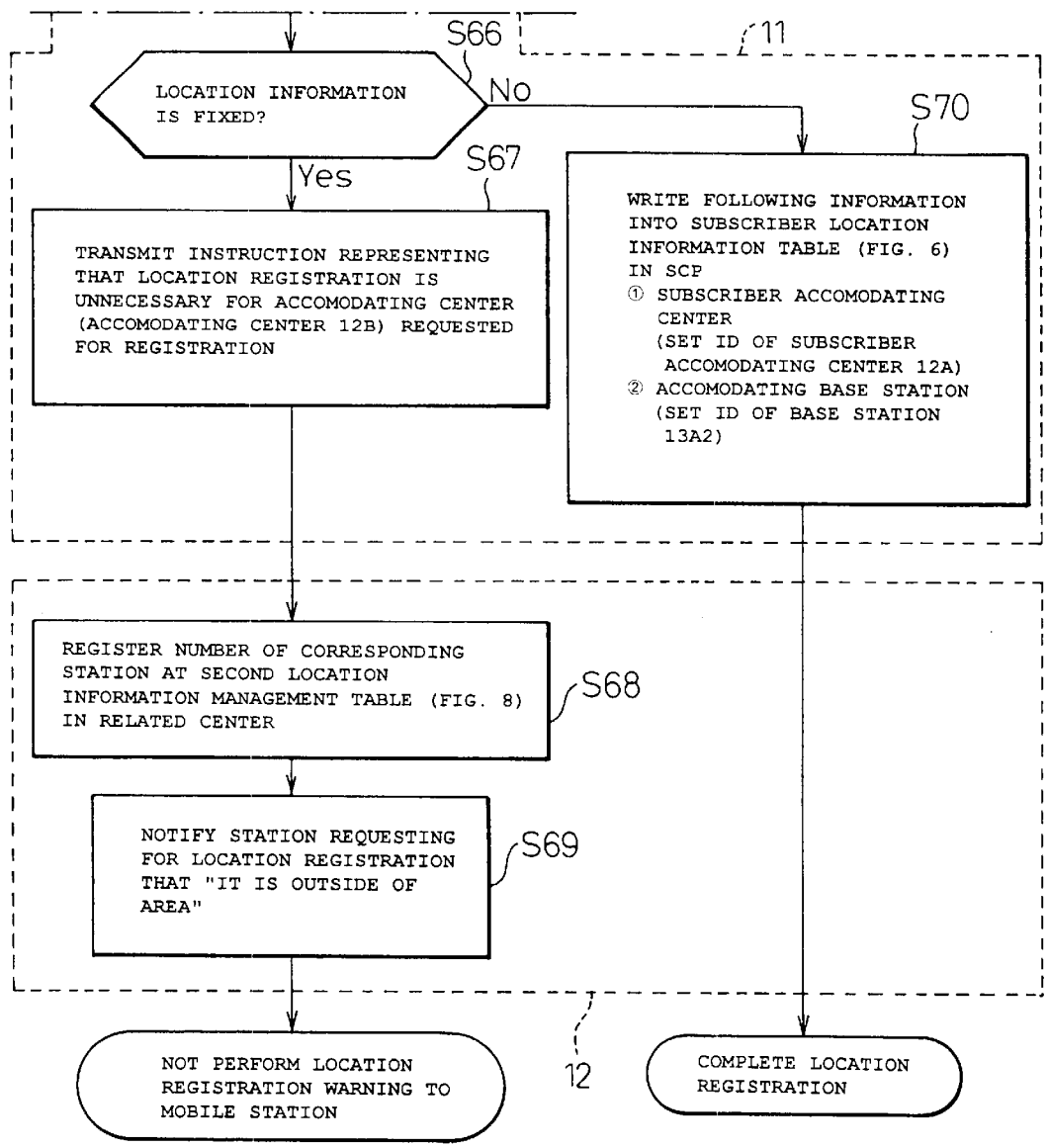
FIG. 18 is a flow chart of a service added to the processing of FIG. 15 and FIG. 16 (part 2)

FIG. 17 is a flow chart of a service added to the processing of FIG. 15 and FIG. 16 (part 1); and FIG. 18 is the same flow chart (part 2).

In these figures, steps S61 to S64 and S68 to S69 are parts of the processing performed by the subscriber accommodating center 12, while steps S65 to S67 and S70 are parts of the processing performed by the service control point 11.

The step to be noted the most in the steps shown in these figures is step S69 of FIG. 18.

In short, the other subscriber accommodating center (for example 12B) other than the subscriber accommodating center (for example 12A) fixing the location information notifies the subscriber of the mobile terminal 15 fixing the location in the subscriber accommodating center 12A that it is outside the area for which it has registered its fixed location (for example, 14b1 and 14bn).

When the result of determination at step S62 of FIG. 17 is "NO", the subscriber accommodating center 12B requests location registration for the mobile terminal 15 as usual to the service control point 11 (S64).

When receiving from the service control point 11 a notification to the effect that the fixing of the location information has been registered for the mobile terminal 15, the result of determination at step S66 of FIG. 18 becomes "YES". After step S68 similar to step S40 of FIG. 14 explained above, the fact of being outside the area of the subscriber accommodating center 12A fixed in location information is announced to the subscriber at step S69. Due to this, the subscriber confirms that it is outside the area.

Normally, the subscriber does not check what area it is currently in. Therefore, when the subscriber leaves the area fixed in location, naturally an incoming call from another subscriber ends up being stopped, but it does not become aware of not yet received calls since it is outside the area. To eliminate this disadvantage, the subscriber is notified that it is outside the area by the subscriber accommodating center 12B.

How the subscriber responds after receiving this notification is left open. It may return to its own location-registered area again or key in an instruction from its own terminal to release the fixing of the location information temporarily.

Figure 19:
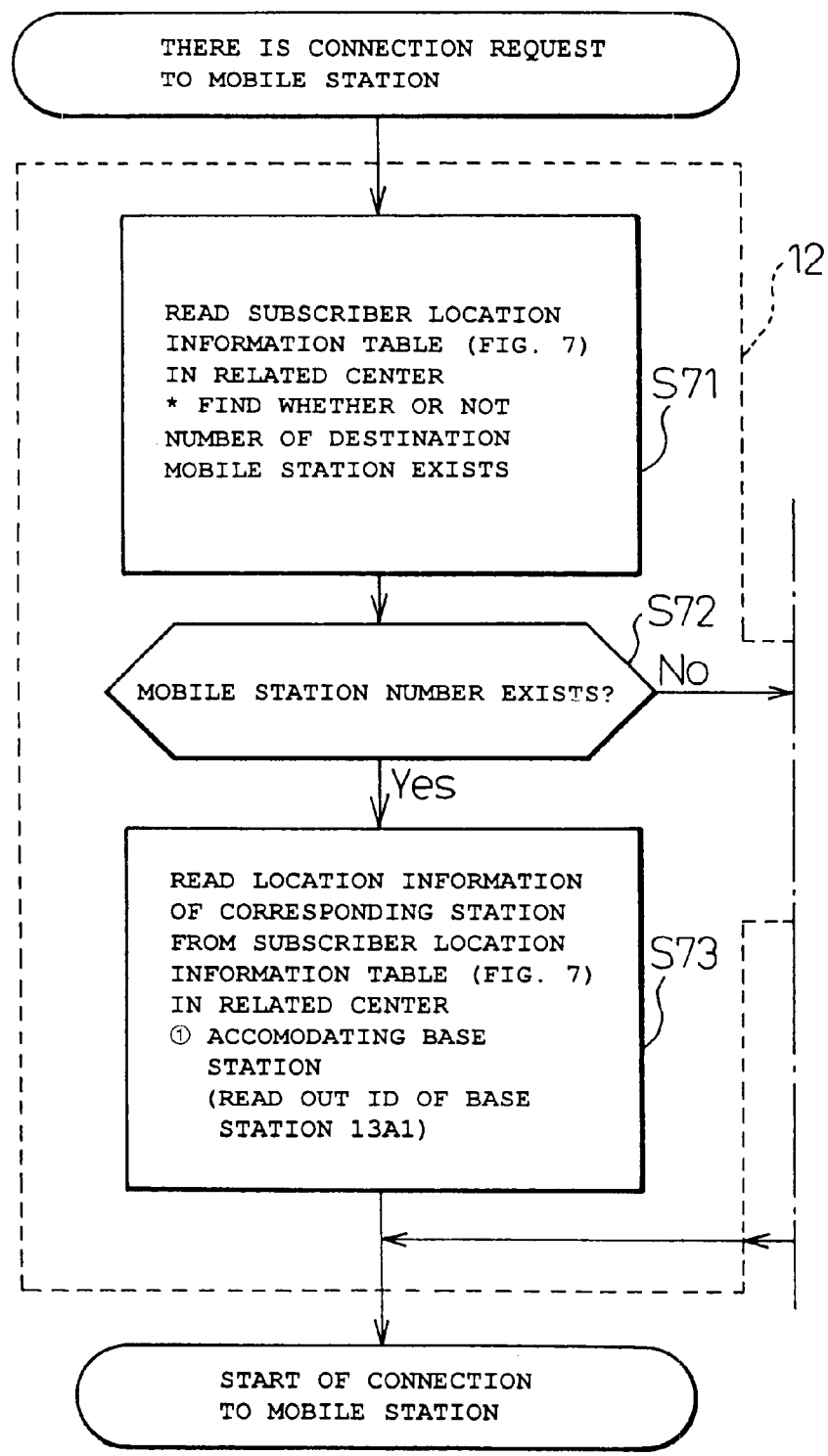
FIG. 19 is a flow chart of processing when there is an incoming call from another subscriber at a mobile terminal of a subscriber registering for fixing of location information (part 1)
Figure 20:
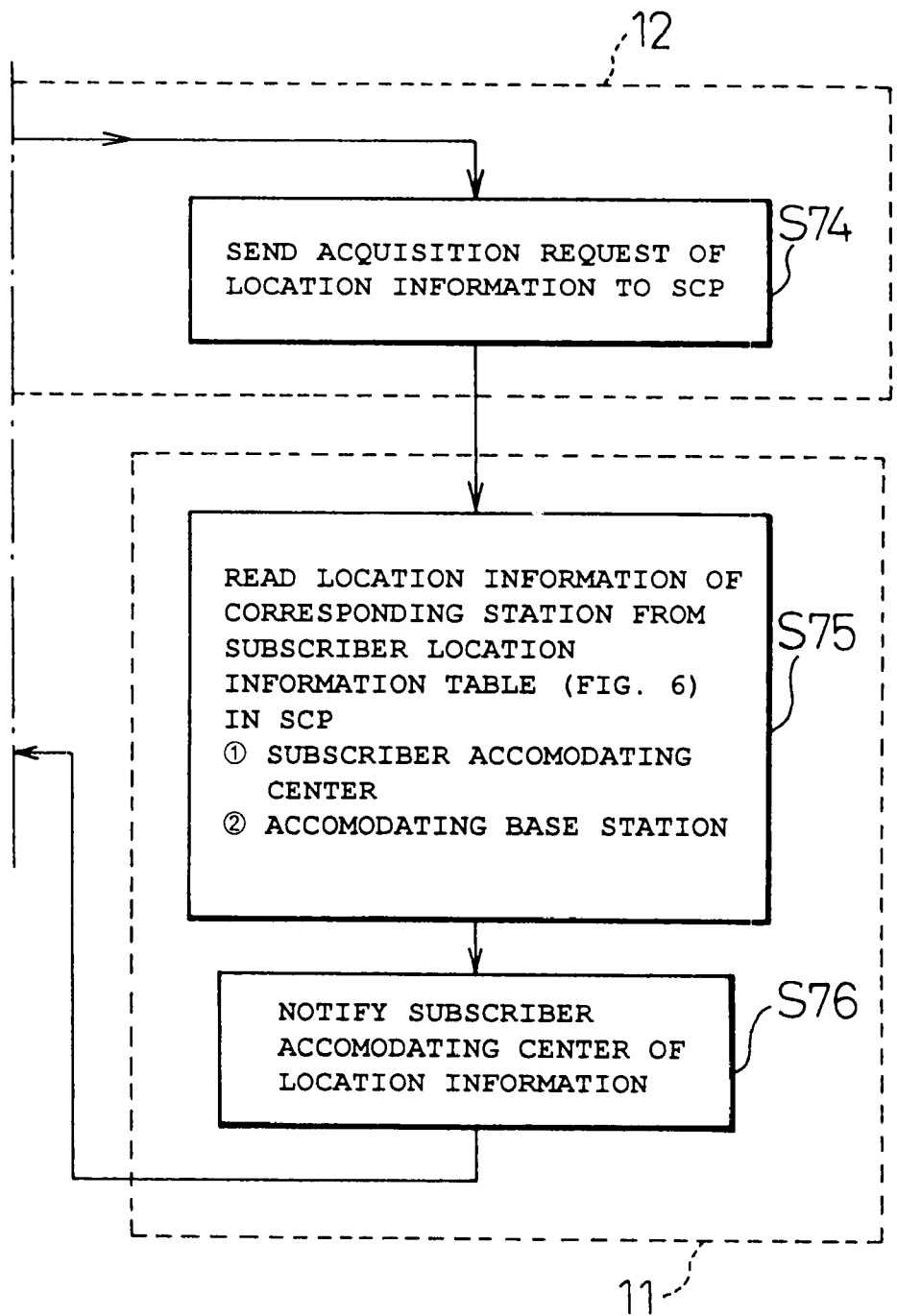
FIG. 20 is a flow chart of processing when there is an incoming call from another subscriber at a mobile terminal of a subscriber registering for fixing of location information (part 2)

FIG. 19 is a flow chart of processing when there is an incoming call from another subscriber at a mobile terminal of a subscriber registering for fixing of the location information (part 1); and FIG. 20 is the same flow chart (part 2).

In these figures, steps S71 to S74 are parts of the processing performed by the subscriber accommodating center 12, while steps S75 and S76 are parts of the processing performed by the service control point 11.

In short, the processing of FIG. 19 and FIG. 20 further comprises having the subscriber accommodating center 12A connect mobile terminals (15, 15X) in accordance with only location information (table of FIG. 7) regarding mobile terminals 15(X) which it itself manages inside it when a connection request is generated from the mobile terminal 15 of another subscriber for the mobile terminal 15(X) requesting the location information be fixed and the originating mobile terminal 15 and the destination mobile terminal 15(X) are located in the area of the same subscriber accommodating center (for example 12A) (S71, S72).

When it is determined at step S72 that the destination mobile terminal has not been registered (NO), an inquiry is made about the location information of the destination mobile terminal at the service control point 11, so these terminals are connected (S74, S75, S76).

Figure 21:
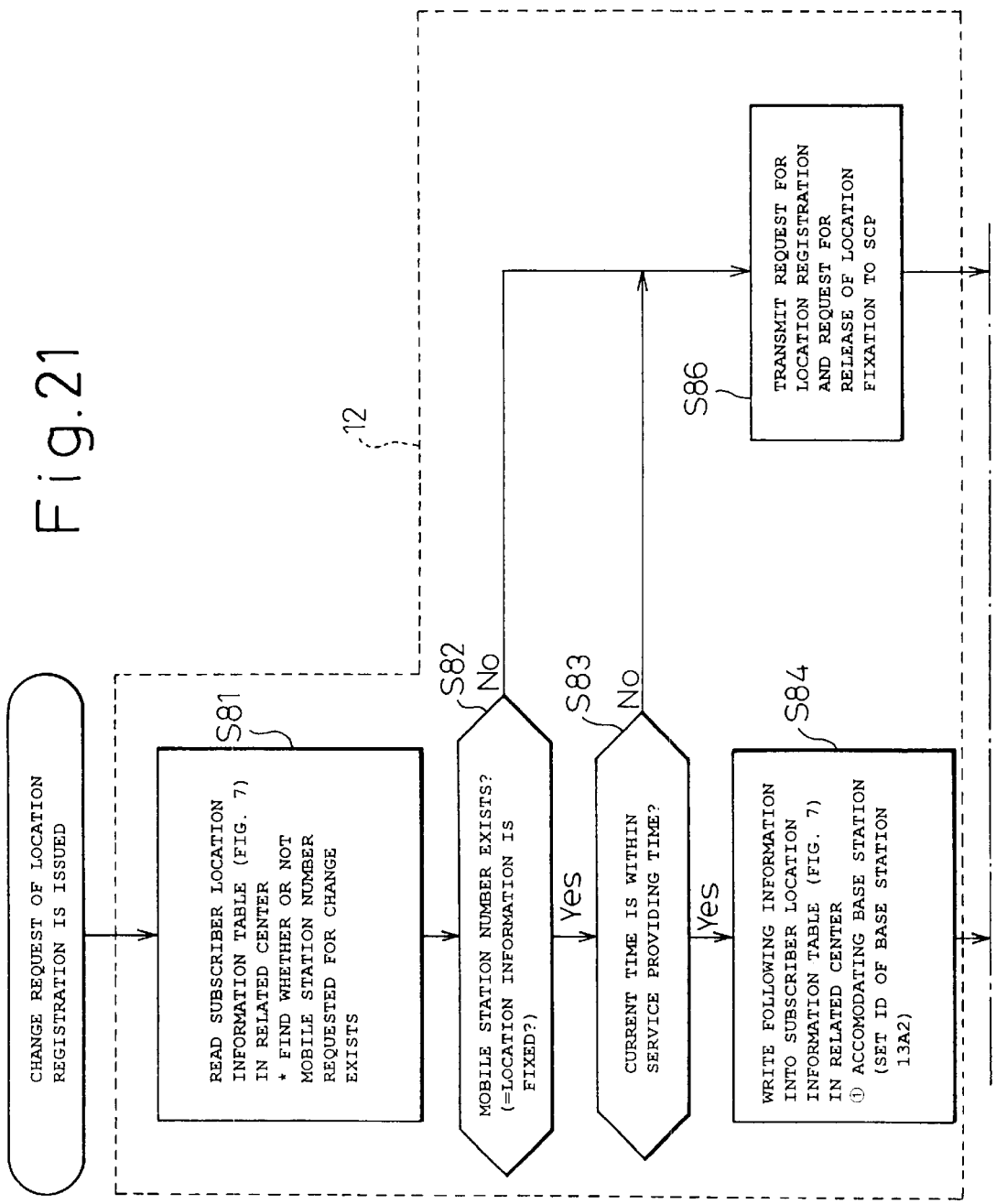
FIG. 21 is a flow chart of processing when a time limit is set for the location information fixing service (part 1)
Figure 22:
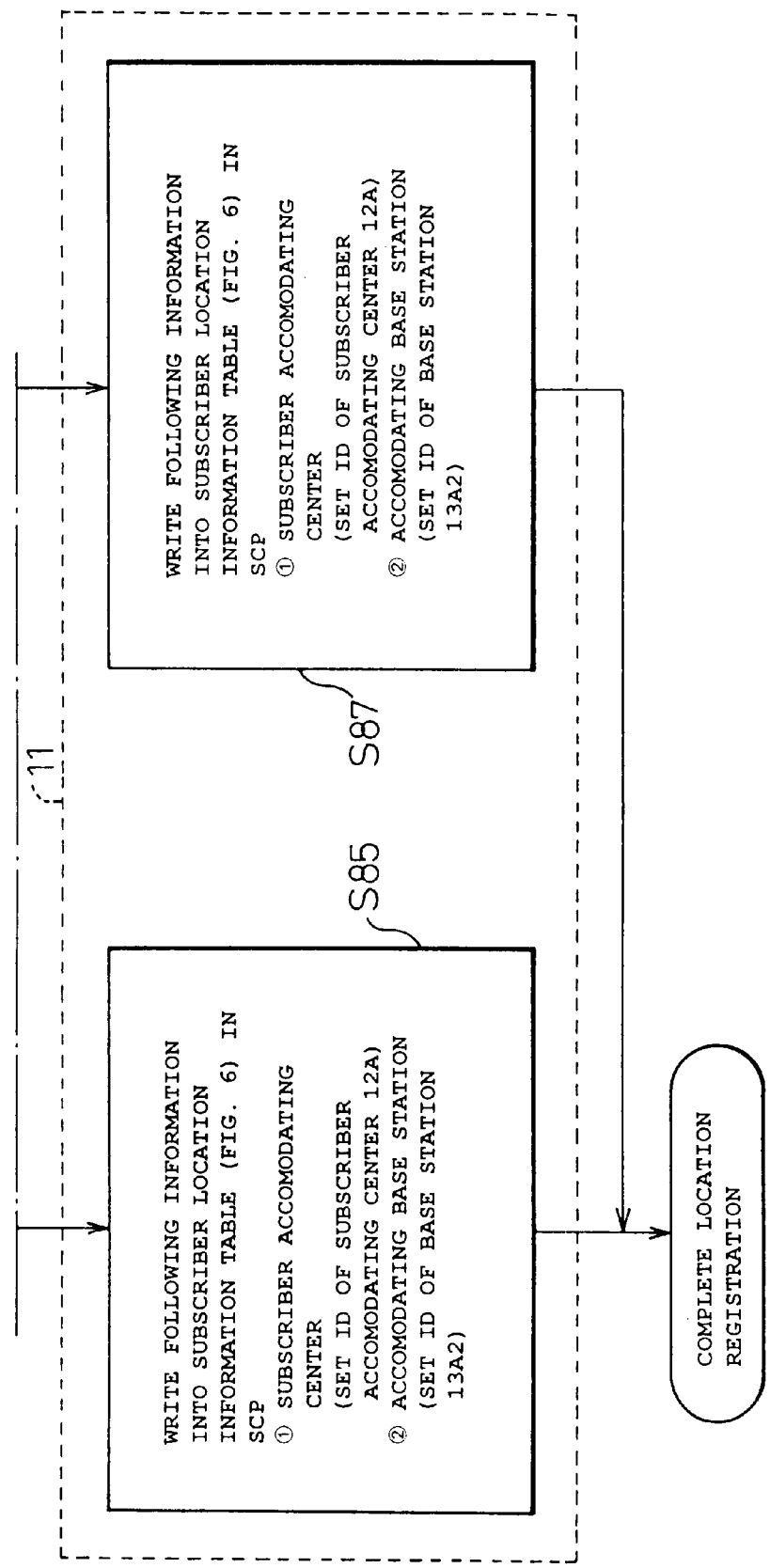
FIG. 22 is a flow chart of processing when a time limit is set for the location information fixing service (part 2)

FIG. 21 is a flow chart of processing when a time limit is set for the location information fixing service (part 1); and FIG. 22 is the same flow chart (part 2).

In these figures, steps S81 to S85 and S86 are parts of the processing performed at the subscriber accommodating center 12, while steps S85 and S87 are parts of the processing performed at the service control point 11.

The location information fixing service according to the present invention functions effectively in the above second aspect of use (where the range of activity is narrow). For example, in a week, the hours when a subscriber is present in an office building are extremely long on Monday to Friday. On the weekends, however, there is a high probability of his or her being out of the office building or at distant locations. That is, this is the first aspect of use explained above.

Therefore, it is convenient to preset the hours of provision of the location information fixing service. The data for this is shown as the service start time and service end time in FIG. 7 and FIG. 8.

In short, the processing of FIG. 21 and FIG. 22 further comprises registering service provision hours where a service of fixing location information can be obtained in the subscriber accommodating centers 12 and the service control point 11 in advance, determining if the time of occurrence is within the service provision hours each time a change of status of the mobile terminal 15 is generated (S82), and, when outside the service provision hours, not fixing the location information and requesting location registration to the service control point (S86, S87).

By having the service provision hours managed by the service control point 11, it is possible to eliminate for the subscribers the trouble of registering/releasing.

Figure 23:
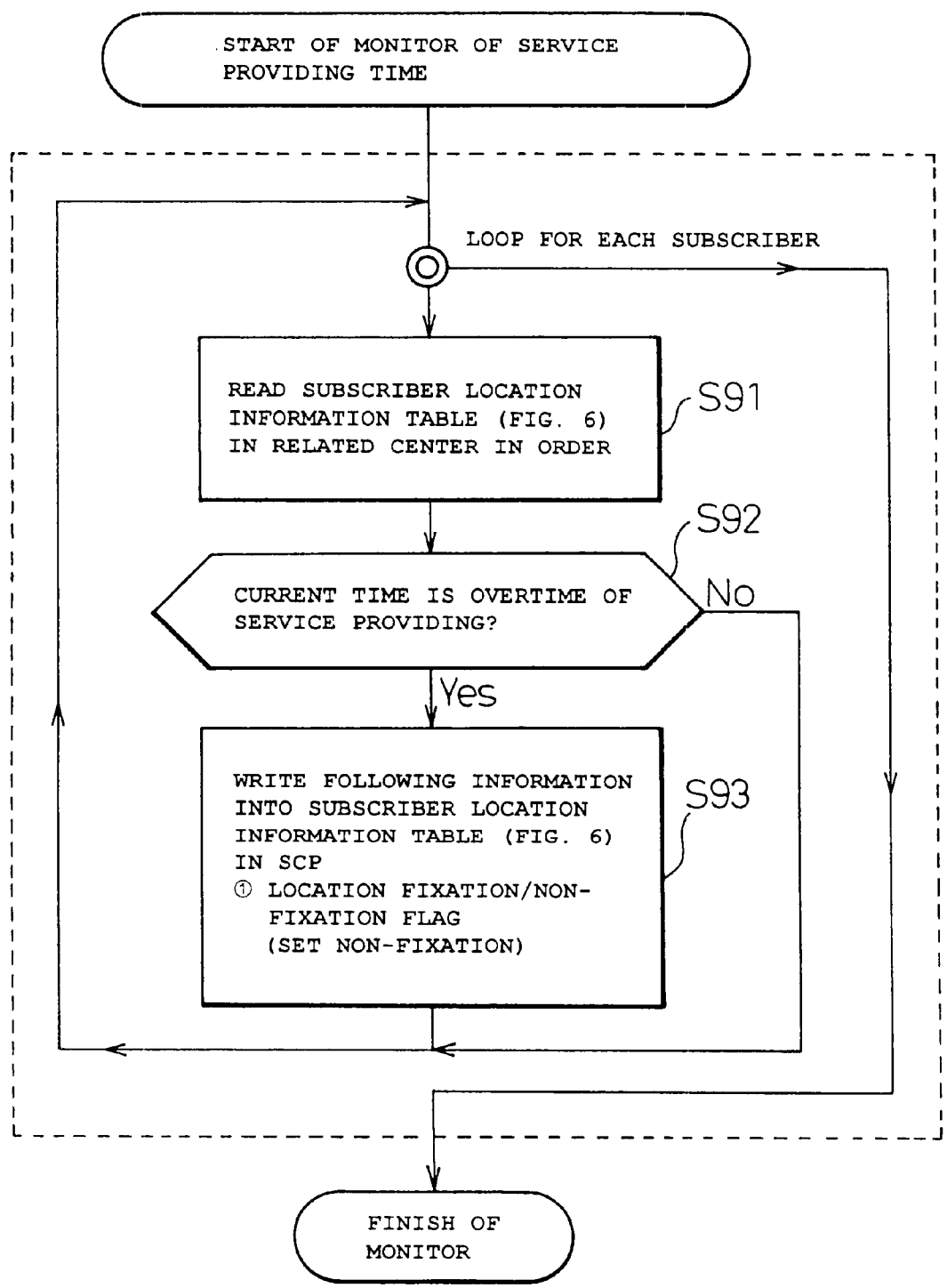
FIG. 23 is a flow chart of processing for monitoring service provision hours in a service control point.

FIG. 23 is a flow chart of processing for monitoring the service provision hours in a service control point.

The service control point 11 periodically monitors the subscriber location information table (FIG. 6) in it, in particular, the service start time and end time (steps S91 and S92).

When outside the service provision hours (YES in step S92), the fixing/nonfixing flag in the table area corresponding to the subscriber concerned is set to "nonfixing".

The above operation is successively performed for all subscribers.

An example of the hardware configuration for the method of management of location information according to the present invention explained above will be explained for the subscriber accommodating center 12 and the service control point 11. Note that no change in hardware is necessary for the mobile terminal 15 and the base station 13, so the existing resources can be utilized as they are.

Figure 24:
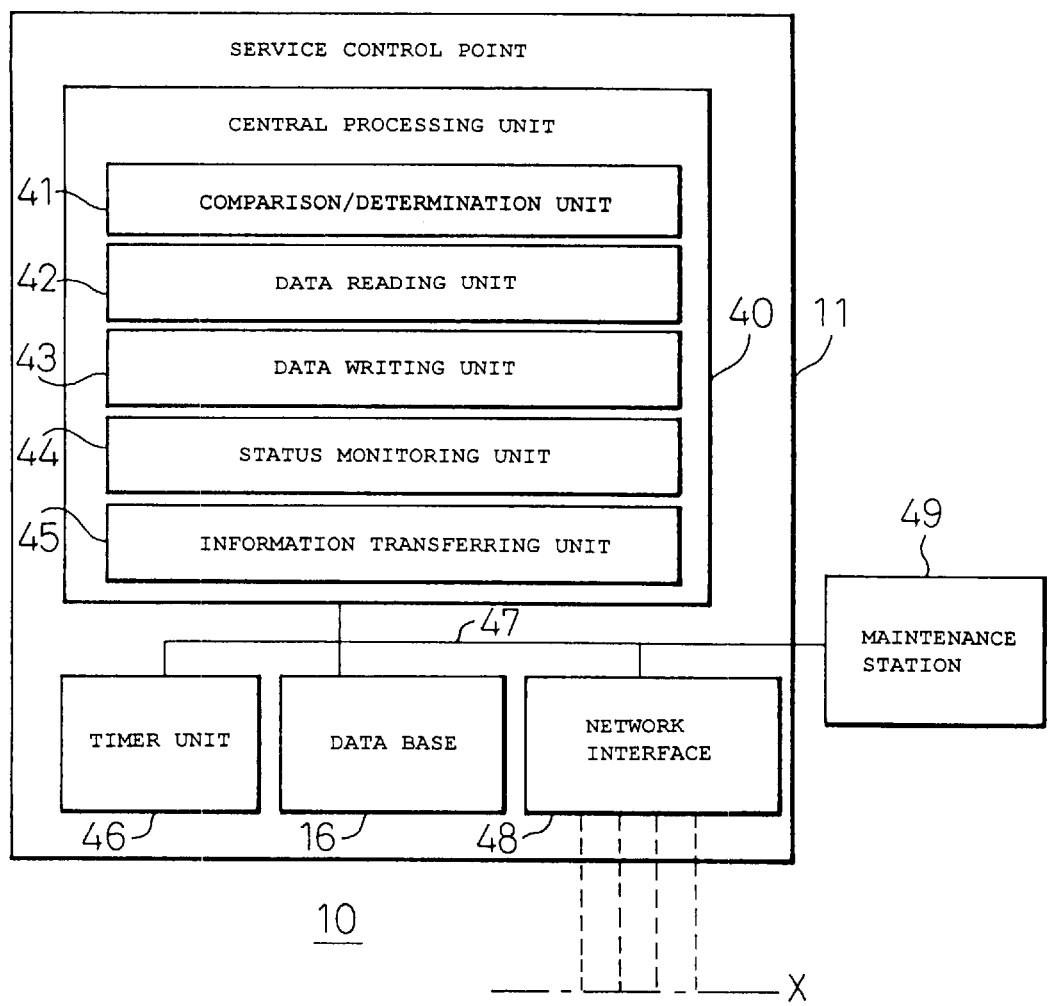
FIG. 24 is a view of an example of the hardware configuration of a mobile switching network according to the present invention (part 1)
Figure 25:
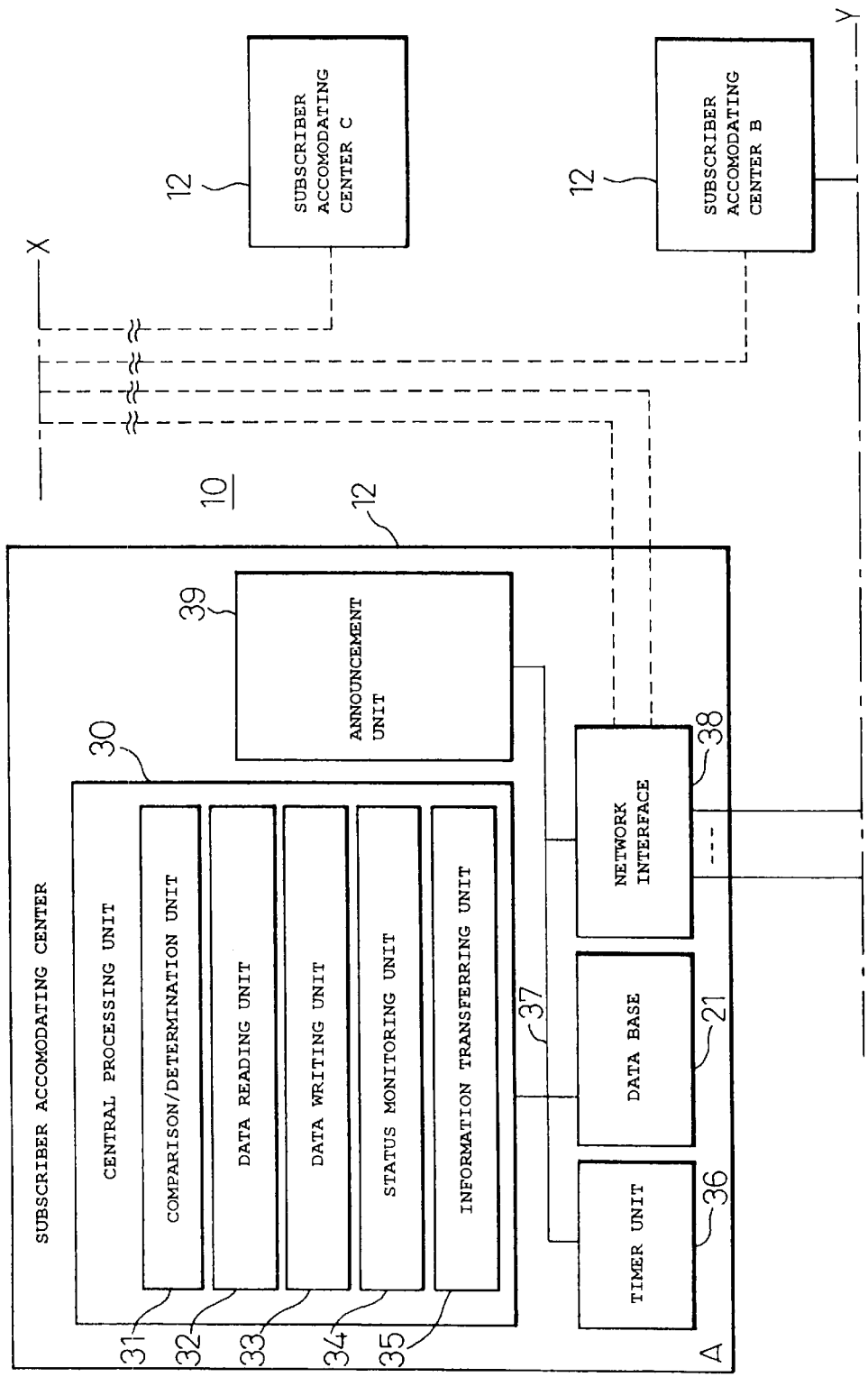
FIG. 25 is a view of an example of the hardware configuration of a mobile switching network according to the present invention (part 2)
Figure 26:
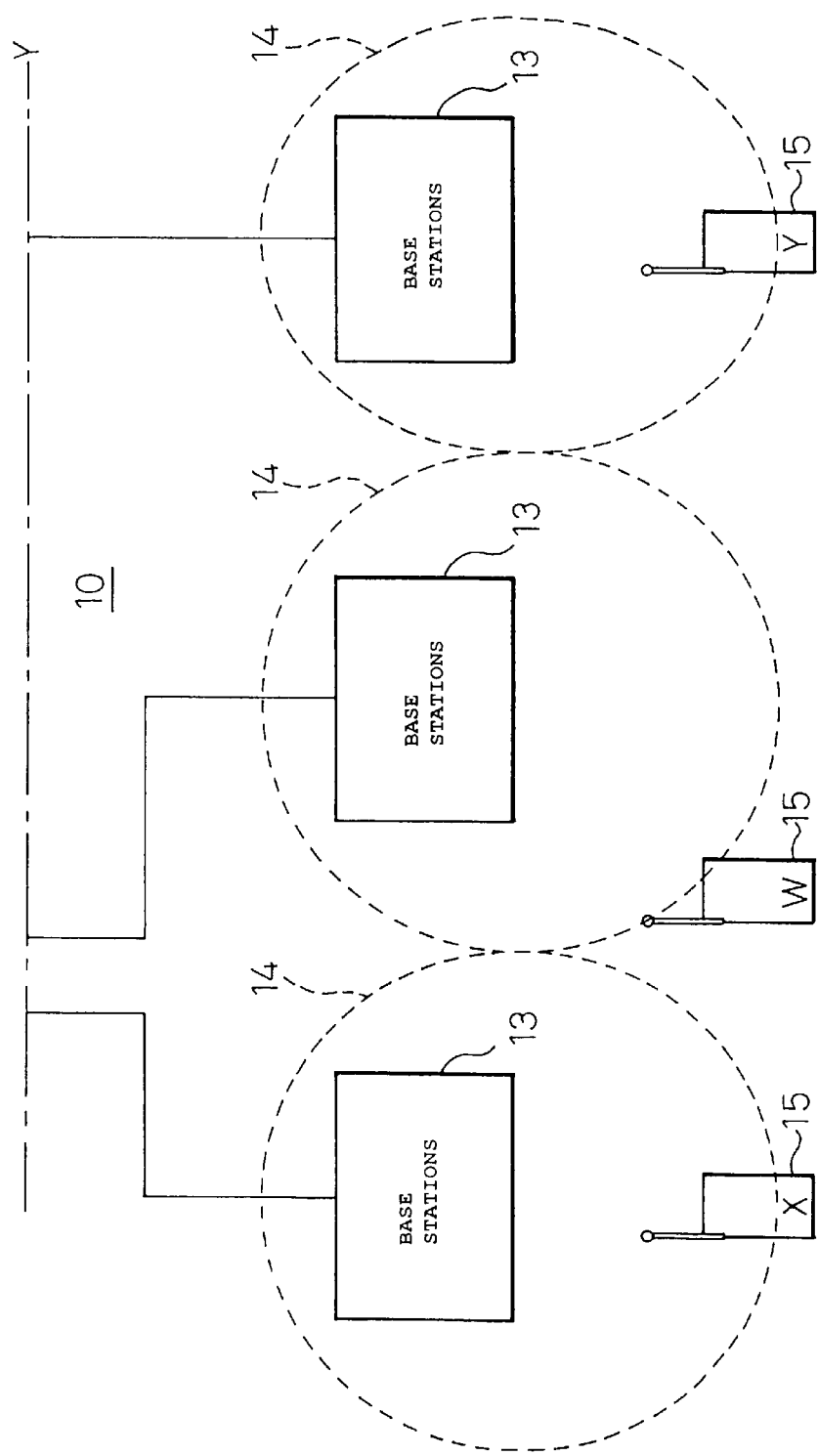
FIG. 26 is a view of an example of the hardware configuration of a mobile switching network according to the present invention (part 3).

FIG. 24 is a view of an example of the hardware configuration of a mobile switching network according to the present invention (part 1), FIG. 25 is the same view (part 2), and FIG. 26 is the same view (part 3). FIG. 24 shows this mainly for the service control point 11, while FIG. 25 shows this mainly for the subscriber accommodating center 12.

First, looking at the subscriber accommodating center 12, the subscriber accommodating center 12 is comprised of:

(i) a memory means for storing subscriber information data;

(ii) a status monitoring means for receiving a request for fixing location information from a subscriber of a mobile terminal 15;

(iii) a data writing means for writing in the memory means subscriber information data including data of at least an accommodating base station relating to the subscriber when receiving a request for fixing the location information by the status monitoring means; and (iv) an information transferring means for transferring a request for fixing the location information together with the subscriber information data relating to the subscriber to a service control point 11 at a level higher than the subscriber accommodating center 12.

The memory means is realized as a database 21, the status monitoring means is realized as a status monitoring unit 34, the data writing means is realized as a data writing unit 33, and the information transferring means is realized as an information transferring unit 35 when viewing the above means with reference to FIG. 25.

The units 33, 34, and 35 are formed as functional parts in a central processing unit (CPU) 30. This CPU 30 cooperates with the above units through a common bus 37.

The subscriber accommodating center 12 further comprises a data reading means for reading any location information of a mobile terminal stored in the memory means at the time when it becomes necessary to re-register the location information of the mobile terminal in the service control point 11 due to a change in status of the mobile terminal 15.

The data reading means is realized as a data reading unit 32 when viewed with reference to FIG. 25.

The subscriber accommodating center 12 provides in the memory means (21) a memory area for displaying the fact that the location information is fixed for the mobile terminal when a need arises for re-registering the location information of the mobile terminal in the service control point 11 due to a change in status of the mobile terminal, the service control point is accessed, and there is an instruction to the effect of fixing the location information for the mobile terminal from the service control point. The memory area is as shown in FIG. 8 (second subscriber information data table).

The subscriber accommodating center 12 provides in the memory means (21) a memory area for storing the service provision hours for a subscriber requesting a service for fixing the location information. The memory area is as shown in FIG. 7 (first subscriber information data table).

The subscriber accommodating center 12 further comprises a comparison and determination means for comparing the current time with the above service provision hours and determining if it is in the service provision time zone. This comparison and determination means is realized as a comparison and determination unit 31 when viewed with reference to FIG. 25. The time is managed in this case by a timer unit 36 in the figure.

In FIG. 25, an announce unit 19 is activated when executing step S69 of FIG. 18. Further, the network interface 38 in the figure functions on the one hand as an interface when transferring information with the service control point 11 and functions on the other hand as an interface when transferring information with the base station group 13 shown in FIG. 26.

Next, looking at the service control point 11, the service control point 11 first is comprised by:

(i) a memory means for individually storing subscriber location information of all subscribers;

(ii) a status monitoring means for receiving any request for fixing location information from a subscriber of a mobile terminal 15 from the subscriber or from a subscriber accommodating center 12 at a level under it;

(iii) a data writing means for writing in the memory means an indication to the effect that location information is fixed and subscriber information data including data of at least a subscriber accommodating center 12 relating to the subscriber when receiving a request for fixing the location information by the status monitoring means.

The memory means is realized as a database 16, the status monitoring means is realized as a status monitoring unit 44, the data writing means is realized as a data writing unit 43, and the information transferring means is realized as an information transferring unit 45 when viewing the above means with reference to FIG. 24.

The units 43, 44, and 45 are formed as functional parts in a central processing unit (CPU) 40. This CPU 40 cooperates with the above units through a common bus 47. Further, a maintenance terminal 49 is also connected to the common bus 47. As already explained, it is possible to register the fixing of the location information from the maintenance terminal 49 as well.

The service control point 11 further has an information transferring means for transferring subscriber information data relating to the subscriber to the subscriber accommodating center 12 when there is a request for fixing the location information from a subscriber.

The information transferring means is realized as the information transferring unit 45 when viewed with reference to FIG. 24.

The service control point 11 further has a data reading means for reading any request for fixing location information of the mobile terminal stored in the memory means when receiving a request for re-registration of the location information of the mobile terminal from the subscriber accommodating center 12 due to a change in status of the mobile terminal 15 and sends the subscriber accommodating center 12 a signal to the effect that the location information of the mobile terminal is fixed through the information transferring means. The data reading means is realized as the data reading unit 42 when viewed with reference to FIG. 24.

The service control point 11 provides in the memory means (16) a memory area for storing the service provision hours for a subscriber requesting a service for fixing location information. This memory area is shown in FIG. 6.

The service control point 11 further has a comparison and determination means for periodically comparing the current time with the above service provision hours and determining if it is in the service provision time zone. The comparison and determination means is realized as the comparison and determination unit 41 when viewed with reference to FIG. 24. The time in this case is managed by the timer unit 46 in the figure.

In FIG. 24, the network interface 48 functions as an interface when transferring information with subscriber accommodating centers 12.

As explained above, according to the present invention, it is possible to greatly slash the load required for access from individual subscriber accommodating centers (12) to a service control point (11) in a mobile switching network (10).

What is claimed is:

1. A method of management of location information for a mobile terminal in a mobile switching network having a subscriber accommodating center accommodating a mobile terminal through a base station and a service control point at a level higher than the subscriber accommodating center and managing location information of all mobile terminals, comprising fixing the location information for a mobile terminal at the service control point in accordance with a request from the subscriber of the mobile terminal and having said subscriber accommodating center having said mobile terminal under it stop the location registration for the mobile terminal at the subscriber accommodating center.

2. A method of management of location information as set forth in claim 1, further comprising having said subscriber accommodating center receiving a request for fixing said location information from the subscriber of said mobile terminal manage the location information of the mobile terminal on its own.

3. A method of management of location information as set forth in claim 2, further comprising sending a request for fixing said location information from said subscriber from the mobile terminal of the subscriber and having said subscriber accommodating center receiving the request notify said request to said service control point.

4. A method of management of location information as set forth in claim 2, further comprising having a request for fixing said location information from said subscriber received at said service control point and having said service control point notify said request to said service control point.

5. A method of management of location information as set forth in claim 2, further comprising having said subscriber accommodating center determine if location information regarding said mobile terminal is fixed or not fixed when a request for re-registration of said location information is generated due to a change in status of said mobile terminal, having that center execute the re-registration of the location information when it is fixed, and requesting re-registration of the location information to said service control point when it is not fixed.

6. A method of management of location information as set forth in claim 2, further comprising having a subscriber accommodating center other than the subscriber accommodating center receiving the request for fixing the location information determine if said location information of said mobile terminal has been registered as fixed at said service control point when a change in status of said mobile terminal occurs in an area of said other subscriber accommodating center and register the ID of the mobile terminal as an ID not requiring location registration in the service control point inside it when it is registered as fixed.

7. A method of management of location information as set forth in claim 6, further comprising having a subscriber accommodating center other than the subscriber accommodating center receiving the request for fixing the location information determine if said ID is registered inside it when a change in status of said mobile terminal occurs in an area of the subscriber accommodating center and not perform location registration with respect to said service control point when it is registered.

8. A method of management of location information as set forth in claim 7, further comprising having said other subscriber accommodating center notify the subscriber of the mobile terminal that it is outside the area for which it has registered its fixed location.

9. A method of management of location information as set forth in claim 2, further comprising having said subscriber accommodating center connect mobile terminals in accordance with only location information regarding mobile terminals which it itself manages inside it when a connection request is generated from the mobile terminal of another subscriber for said mobile terminal requesting the location information be fixed and the originating mobile terminal and the destination mobile terminal are located in the area of the same subscriber accommodating center.

10. A method of management of location information as set forth in claim 2, further comprising registering service provision hours during which a service of fixing location information can be obtained in said subscriber accommodating centers and said service control point in advance, determining if the time of occurrence is within the service provision hours each time a change of status of the mobile terminal is generated, and, when outside the service provision hours, not fixing the location information and requesting location registration to said service control point.

11. A subscriber accommodating center characterized by being comprised of:
a memory means for storing subscriber information data;
a status monitoring means for receiving a request for fixing location information from a subscriber of a mobile terminal;
a data writing means for writing in said memory means subscriber information data including data of at least an accommodating base station relating to said subscriber when receiving a request for fixing said location information by said status monitoring means; and
an information transferring means for transferring a request for fixing said location information together with said subscriber information data relating to said subscriber to a service control point at a level higher than the subscriber accommodating center.

12. A subscriber accommodating center as set forth in claim 11, further comprising a data reading means for reading any location information of said mobile terminal stored in said memory means when it becomes necessary to reregister the location information of the mobile terminal in the service control point due to a change in status of the mobile terminal.

13. A subscriber accommodating center as set forth in claim 11, providing in said memory means a memory area for displaying the fact that the location information is fixed for said mobile terminal when a need arises for reregistering the location information of the mobile terminal in the service control point due to a change in status of the mobile terminal, the service control point is accessed, and there is an instruction to the effect of fixing the location information for the mobile terminal from the service control point.

14. A subscriber accommodating center as set forth in claim 11, providing in said memory means a memory area for storing the service provision hours for a subscriber requesting a service for fixing the location information.

15. A subscriber accommodating center as set forth in claim 14, further comprising a comparison and determination means for comparing the current time with the above service provision hours and determining if it is in the service provision hours.

16. A service control point characterized by being comprised of:
a memory means for individually storing subscriber information data of all subscribers;
a status monitoring means for receiving any request for fixing location information from a subscriber of a mobile terminal from the subscriber or from a subscriber accommodating center at a level under it;
a data writing means writing in said memory means an indication to the effect that location information is fixed and subscriber information data including data of at least a subscriber accommodating center relating to said subscriber when receiving a request for fixing said location information by said status monitoring means.

17. A service control point as set forth in claim 16, further comprising an information transferring means for transferring said subscriber information data relating to said subscriber to said subscriber accommodating center when there is a request for fixing said location information from said subscriber.

18. A service control point as set forth in claim 17, further comprising a data reading means for reading any request for fixing location information of said mobile terminal stored in said memory means when receiving a request for reregistration of the location information of said mobile terminal from the subscriber accommodating center due to a change in status of the mobile terminal and sending a signal to the effect that the location information of said mobile terminal is fixed through the information transferring means.

19. A service control point as set forth in claim 16, providing in said memory means a memory area for storing the service provision hours for a subscriber requesting a service for fixing the location information.

20. A service control point as set forth in claim 19, further comprising a comparison and determination means for periodically comparing the current time with the above service provision hours and determining if it is in the service provision hours.

* * * * *